INVENTOR
McKAY GOODE
MACDONALD J. WIGGINS
BY Julian C. Renfro
ATTORNEY

INVENTOR
McKAY GOODE
MACDONALD J. WIGGINS
BY Julian C. Renfro
ATTORNEY

INVENTOR
McKAY GOODE
MACDONALD J. WIGGINS
BY Julian C. Renfro
ATTORNEY

INVENTOR
McKAY GOODE
MACDONALD J. WIGGINS
BY Julian C. Renfro
ATTORNEY

INVENTOR
McKAY GOODE
MACDONALD J. WIGGINS
BY Julian C. Renfro
ATTORNEY

INVENTOR
McKAY GOODE
MACDONALD J. WIGGINS

BY Julian C. Renfro
ATTORNEY

Dec. 28, 1965 McKAY GOODE ET AL 3,226,644

TROPOSPHERIC SCATTER COMMUNICATION SYSTEM HAVING HIGH DIVERSITY GAIN

Filed April 12, 1962 10 Sheets-Sheet 7

INVENTOR
McKAY GOODE
MACDONALD J. WIGGINS
BY Julian C. Renfro
ATTORNEY

INVENTOR
McKAY GOODE
MACDONALD J. WIGGINS
BY Julian C. Renfro
ATTORNEY

INVENTOR
McKAY GOODE
MACDONALD J. WIGGINS
BY Julian C. Renfro
ATTORNEY

Dec. 28, 1965 McKAY GOODE ET AL 3,226,644

TROPOSPHERIC SCATTER COMMUNICATION SYSTEM HAVING HIGH DIVERSITY GAIN

Filed April 12, 1962 10 Sheets-Sheet 10

INVENTOR
McKAY GOODE
MACDONALD J. WIGGINS
BY Julian C. Renfro
ATTORNEY 3,226,644

TROPOSPHERIC SCATTER COMMUNICATION SYSTEM HAVING HIGH DIVERSITY GAIN

McKay Goode and MacDonald J. Wiggins, Orange County, Fla., assignors to Martin-Marietta Corporation, Middle River, Md., a corporation of Maryland Filed Apr. 12, 1962, Ser. No. 186,912
12 Claims. (Cl. 325—56)

Figure 1A:
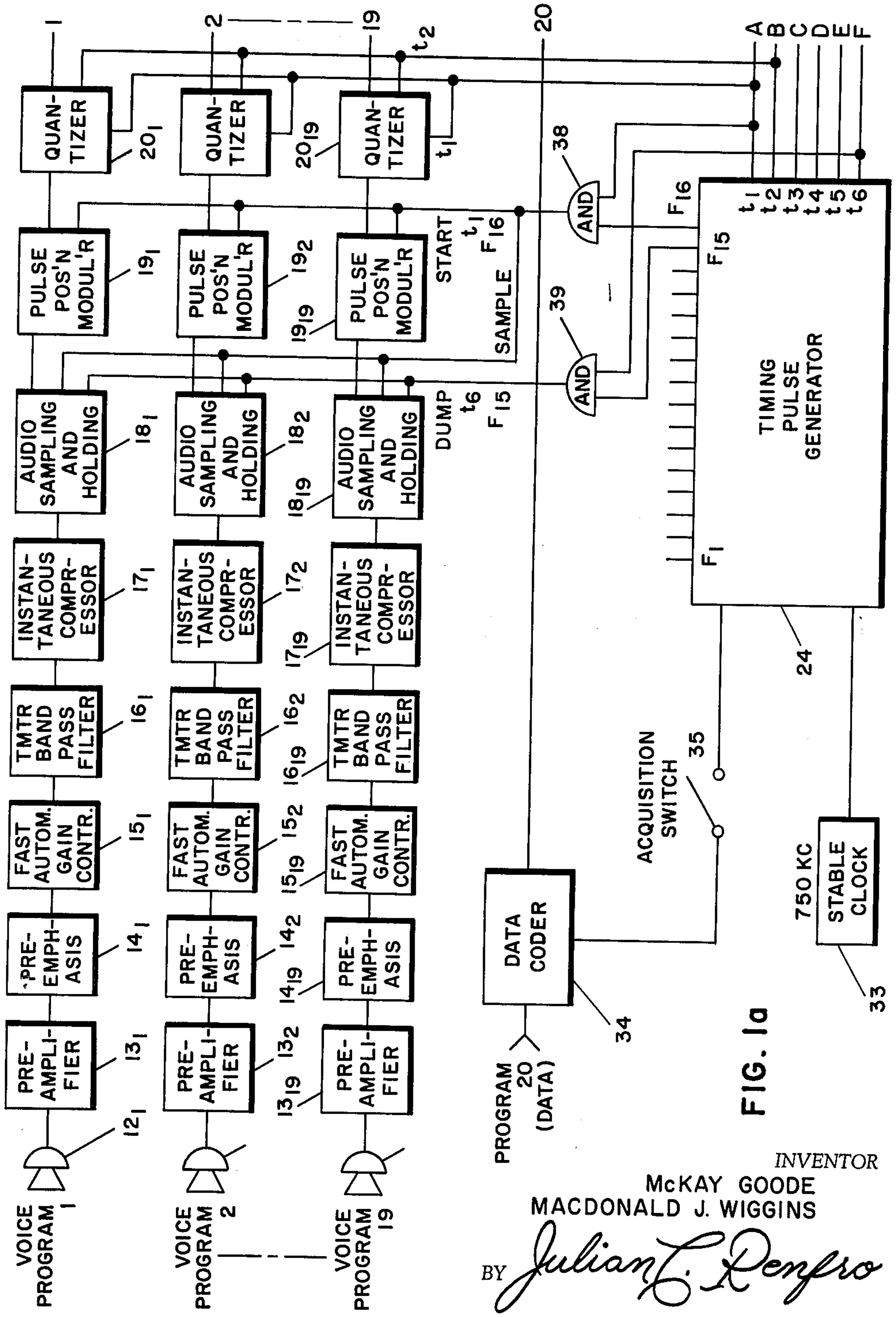

This invention relates to a highly reliable diversity type communication system, and more particularly to a multiple frequency diversity scheme utilizing the tropospheric scatter medium as a means of propagating radio energy, with the multiple frequencies being used to implement a novel multiplexing scheme.

A tropospheric scatter communication system utilizing the scattering mechanism present in the troposphere is a means for signaling over the horizon by means of electromagnetic waves which at ultrahigh frequency or microwave frequency tend to travel in a straight path. However, where such waves are incident on atmospheric dielectric constant irregularities, a scattering process takes place. A very small portion of the energy in the incident wave is thus scattered in a random fashion, and the portion scattered in a forward direction can be utilized for over the horizon transmissions by focusing a suitable antenna on the volume of the troposphere where such scattering is taking place.

For such a system to be practical, it is conventional to use relatively large amounts of power at the transmitter to overcome the very high losses in the scatter mechanism. It is further conventional to use high gain directive antennas to increase the power density in the desired direction.

One of the characteristics of this type propagation is a random concellation and enhancement of the received signals as a function of time. The rate at which these variations occur is on the order of 10 cycles per second. In order to compensate for the reduction in signal strength during the fading times, either large amounts of transmitter power are necessary, or else diversity reception and/or transmission methods must be used. Consequently, the diversity methods which consist of obtaining a number of signals whose fading characteristics are independent of each other allow a reduction in transmitter power.

Prior art signalling systems using the tropospheric scatter medium have used continuous signals, and have attempted to obtain statistically independent signals by means of multiple transmitters and/or receivers, using a plurality of spaced antennas. Other types such as angle diversity or polarization diversity have been used, but each of these requires a separate receiver for each order of diversity.

The present invention obtains superior results over the usual tropospheric scatter systems while utilizing only one transmitter and one receiver, and has for its primary goal the achieving of a multiple order diversity characteristic using one transmitter with its associated antenna, and one receiver with its associated antenna. Thus a worthwhile saving in equipment, cost, size and weight, as well as portability are achieved in our novel troposcatter system.

The basic method by which these aims are realized is the use of a frequency stepping scheme by which all intelligence-bearing signals are transmitted on a number of different frequencies, for example five, each frequency thus carrying redundant information. This is possible by the use of a pulse-type communication system whereby each basic signal pulse is sub-divided into a number of subpulses, each subpulse being transmitted on a different frequency. Due to the characteristics of the tropospheric scatter medium, a relatively small frequency separation is possible while maintaining a high degree of decorrelation between the fading characteristics of each frequency. This characteristic enables the use of a relatively narrow overall system bandwidth, such bandwidth being easily handled by a single radio frequency channel in the transmitter and a single input radio frequency channel in the receiver. Our transmitter preferably uses as many separate oscillators as there are frequencies, whose outputs are combined in time and are handled by the single radio frequency output channel described fully hereinafter.

It is therefore a feature of this invention that a multiplicity of voice and data channels are provided in a single transmitter and receiver arrangement by interleaving the subpulses for each voice and data program in accordance with a unique time and frequency coding technique, with crosstalk inherent in such an arrangement being minimized by a unique detection and demodulation method, coupled with an advantage being taken of the statistical properties of speech and data.

The receiver uses a common radio-frequency front end section to handle the incoming multiple-frequency signal. A single intermediate frequency channel with sufficient bandwidth to handle the multiple-frequency signal drives five narrow band intermediate frequency channels, the center of each narrow band channel being centered on one of the five frequencies as will be more fully described hereinafter.

In order to fully utilize this diversity system, we use a novel time-division multiplexing scheme. This time-division multiplexing is achieved by interleaving the pulses resulting from a large number of input signals, such as twenty for example. A unique time-subpulse-frequency coding scheme has thus been developed which allows the receiver to separate the various signal programs, while making further effective use of the subpulse-multiple frequency signal characteristic used for diversity reasons.

It is therefore an object of this invention to provide a multiplicity of voice and data channels in a single transmitter and receiver by interleaving the subpulses for each of such voice and data programs in a unique time and frequency coding procedure, utilizing unique detection and demodulation techniques and further by taking advantage of the statistical properties of speech and data.

More particularly, it is an object of this invention to provide a diversity type communication system using a single transmitter which propagates a radio frequency signal via the tropospheric scatter medium, and a single receiver which receives the RF signal and extracts the intelligence therefrom, the signal generated by said transmitter having the characteristicss to produce a multiple order frequency diversity with a single power amplifier and a single antenna having a single feed system, the receiver having the capability of receiving, detecting and combining the multiple frequency signals to provide a multiple diversity system gain, using a single antenna feed, single antenna, and single radio frequency circuitry.

Another object of this invention is to provide high quality voice reproduction using quantized speech wherein sixteen quantizing levels are used, with advantageous speech processing providing the equivalent of sixty-four quantizing levels such as prior systems have used. This reduction in the number of quantized levels results in a significant increase in system efficiency.

Still another object of this invention is to provide a pulse type communication system utilizing a form of pulse code modulation with very high error correcting capability by virtue of utilizing the entire time between voice sampling times for transmitting the core corresponding to particular voice levels, in combination with means for superimposing upon the same said time interval, a multiplicity of such pulse codes such that the crossstalk errors inherent in such superposition are essentially corrected by virtue of said pulse code modulation method, such crosstalk error being held to a very small number by means of a unique time-frequency code peculiar to each of said multiple speech signals.

In this system five subpulses have been used to implement this invention. Thus five carrier frequencies are used for transmission of each of the five subpulses, one frequency for each pulse. In the transmitter these five frequencies are generated basically by five gated oscillators. The voice is processed in such a manner as to provide a uniform distribution of voice amplitudes. It is this processing which allows the use of only sixteen quantizing steps in the voice sampler. A total of nineteen such voice processors and quantizers are used, with the output of each voice processor and quantizer operating a pulse position modulator.

Due to the quantization, the output of each pulse position modulator is a series of pulses, each in one of sixteen discrete time frames. This stream of pulses from each of the nineteen voice channels operates a program selector which encodes each voice channel in a different time frequency sequence. One data input channel feeds the program selector and provides a code for such data channel. The data rate is 125,000 pulses per second. With this high rate, provisions can be made for time division multiplexing a large number of low data rate inputs. Due to the limited number of mutually exclusive code combinations, the nineteen voice channels share certain common time-frequency code points, which will cause random crosstalk pulses to appear in the channels. However, the crosstalk pulses because of the nature of the coding will practically always be of a lower amplitude than the correct pulse.

With respect to the data channel a mutually exclusive code has been selected so that no crosstalk pulses are possible in the data channel. The composite radio frequency subpulse streams from the five gated oscillators are heterodyned into the microwave frequency band chosen for operation. In the present embodiment of the system the frequency range from 4.4 to 5 gigacycles is chosen. A stable clock is used in conjunction with highly accurately counting circuits to produce basic timing signals for the voice quantizing and modulating circuits and for operating a program selector matrix. From the heterodyning circuit a power amplifier increases the signal level to that required by the system output. A parabolic antenna is preferably used for radiating the signal.

In the receiver, a parabolic antenna is used which is oriented in such a fashion as to receive the maximum energy from the tropospheric scatter medium. A radio frequency-to-intermediate frequency conversion circuit is fed from the antenna. The intermediate frequency signal is amplified in a wide band preamplifier which feeds five narrow band filters. Each of these narrow band filters is centered on one of the five subpulse frequencies and has a bandwidth sufficient only to pass the subpulse width. The output of each of these five filters drives a respective squaring circuit. The energy in the squared signal for each channel is measured by means of a gated integrator. The gated integrator for each channel is turned on at the beginning of each expected subpulse interval and the integrator level at the end of each subpulse interval is noted. The integrator is then dumped and is ready for a similar operation for the next pulse interval.

A program selecting matrix feeds the output of each of the five gated integrators into a summer at the proper time for a particular time frequency program. Twenty such summers are provided, so each summer indicates the sum of the variances of each of the five channels for each of the 20 programs inasmuch as the variance is proportional to the time average of the instantaneous squared signal.

In the data channel, a threshold is chosen so as to indicate the presence of a signal pulse during a given pulse interval when its summer output is above this threshold and to indicate a presence of no pulse when the signal is below the threshold level. The threshold circuit then regenerates a pulse or produces no output, as such may be indicated. The resulting pulse stream then drives a demultiplexer circuit providing the data output channels.

Since there may be crosstalk pulses coming from an undesired channel in a voice summer output, a novel maximum likelihood detector preferably is used for each voice program. This detector inspects the amplitude of each pulse in the 16-frame sample period and chooses the largest pulse present as the correct pulse. A signal is derived whose amplitude is proportional to the time of arrival of the correct pulse, and this amplitude is held at the end of each sample period. This produces a reproduction of the original signal wave after it has been quantized. This resulting waveform is then reprocessed in such a manner as to more nearly reproduce the original voice signal. The audio signals from each of the nineteen channels are then available for driving suitable telephone lines or transducers.

In order for the receiving system to operate as described, it is necessary that precise timing signals be available to the gated integrators and the threshold and maximum likelihood detectors. Such timing signals are generated by a stable clock which is synchronized from the pulse stream in the data channel and all pertinent time references generated from the data pulse stream. A mathematical analysis of this pulse stream indicates that all pertinent frequencies are present when random data is being sent. However, when the system is first placed in operation the program gating must be correct in order that a pulse stream be present at the data channel output. This requires that an acquisition system for initial synchronization be used. Such an acquisition system requires a preamble be transmitted prior to the beginning of the system traffic. This preamble consists of a continuous sequence of pulses in the data channel with a code indicating pertinent time references. During this acquisition period the integrator gates are disabled, thus a pulse stream is obtained at the data channel output regardless of the frequency and/or phase of the timing clock. The synchronization circuits then extract the proper frequency and phase information from this pulse stream, and correct the frequency and phase of the local clock to coincide with that of the signal, such as by a phase lock loop. At this time, the synchronization circuits will sense that proper timing has been achieved and will enable the normal gating signals to operate the gated integrators.

It will thus be seen that the present invention amounts to a highly reliable multiple-frequency diversity type tropospheric scatter communication system in which the frequencies thus utilized for this purpose are also employed for achieving a desirable time frequency coding arrangement.

Figure 1B:
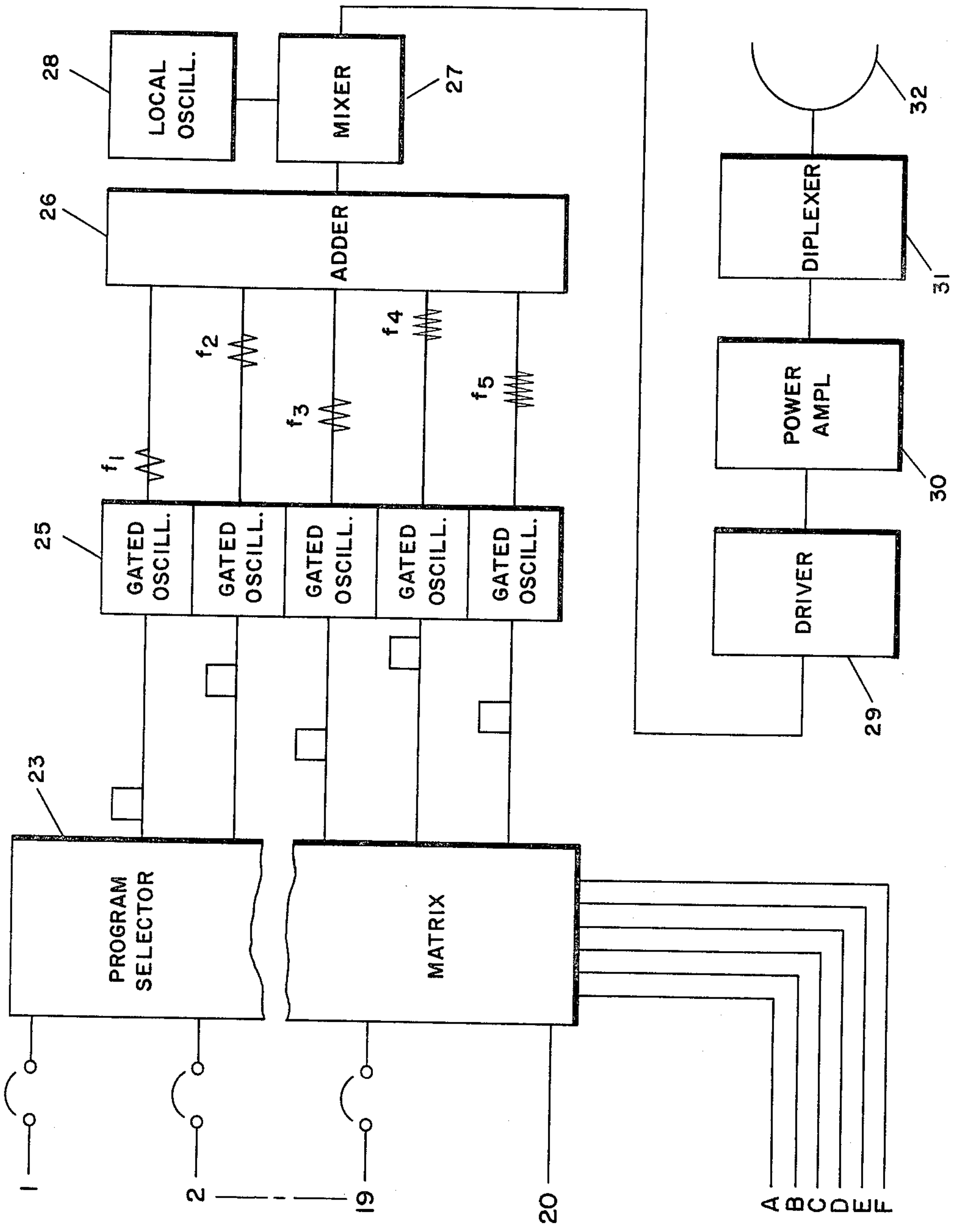

These and other objects, features and advantages of this invention will be apparent from a study of the enclosed drawings wherein:

FIGURES 1*a* and 1*b* together represent the transmitter portion of our communication system, with program designations 1, 2, 19 and 20 as well as the designations A through F along the right hand side of FIGURE 1*a* being understood to be connected with leads on the left hand side of FIGURE 1*b* bearing the same designation.

Figure 2:
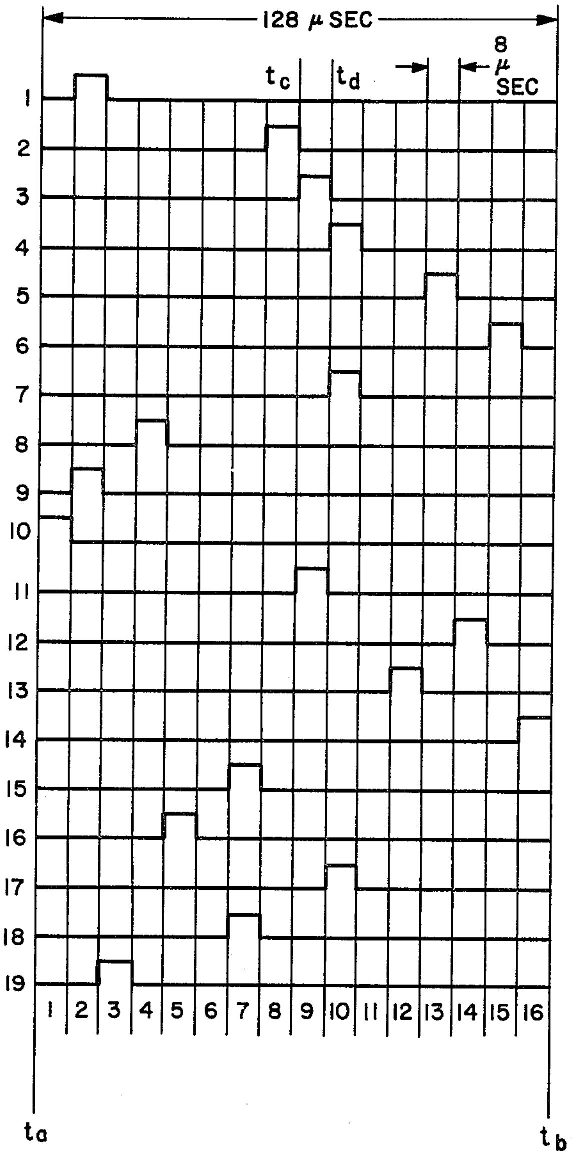
Figure 3A:
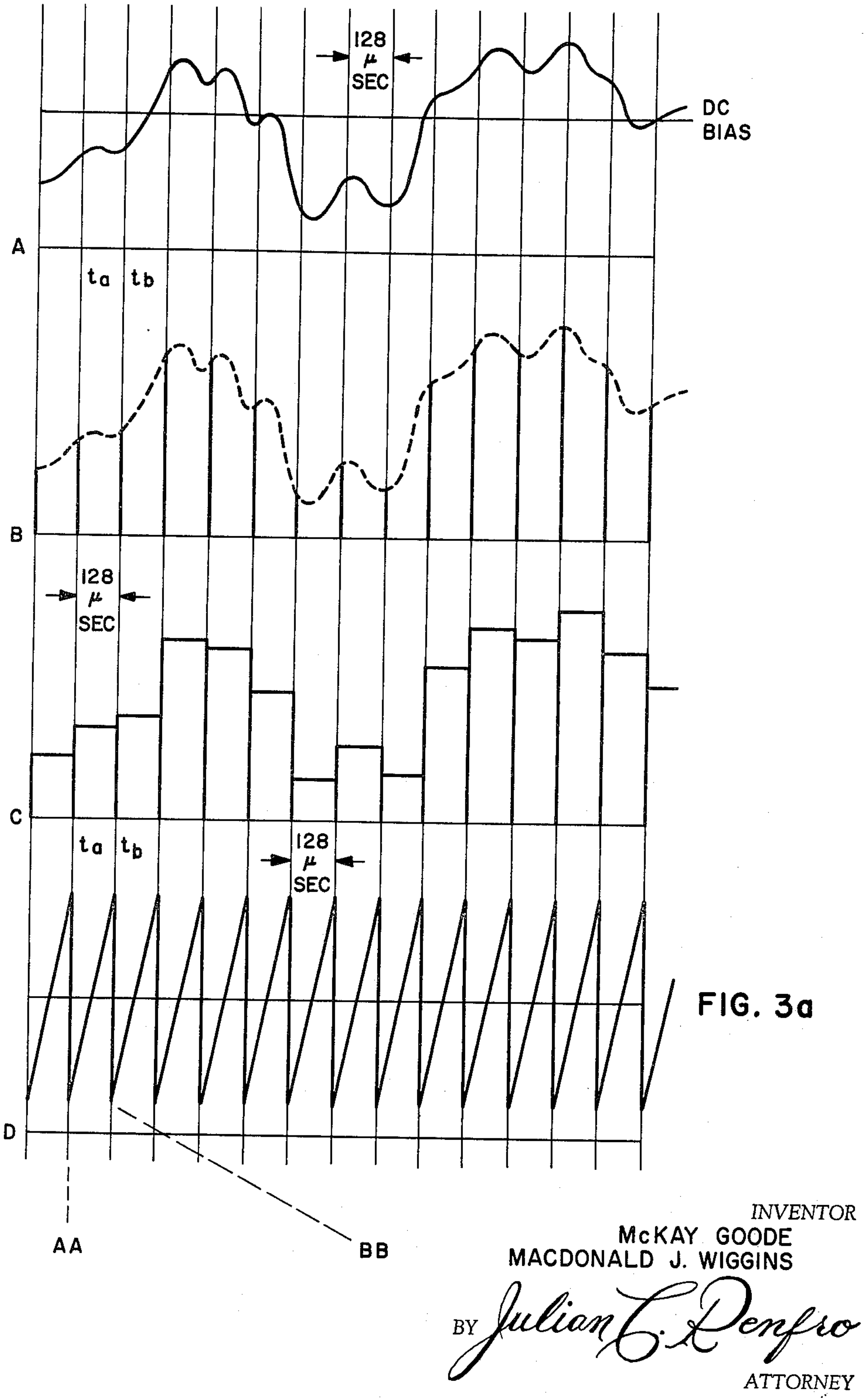
Figure 3B:
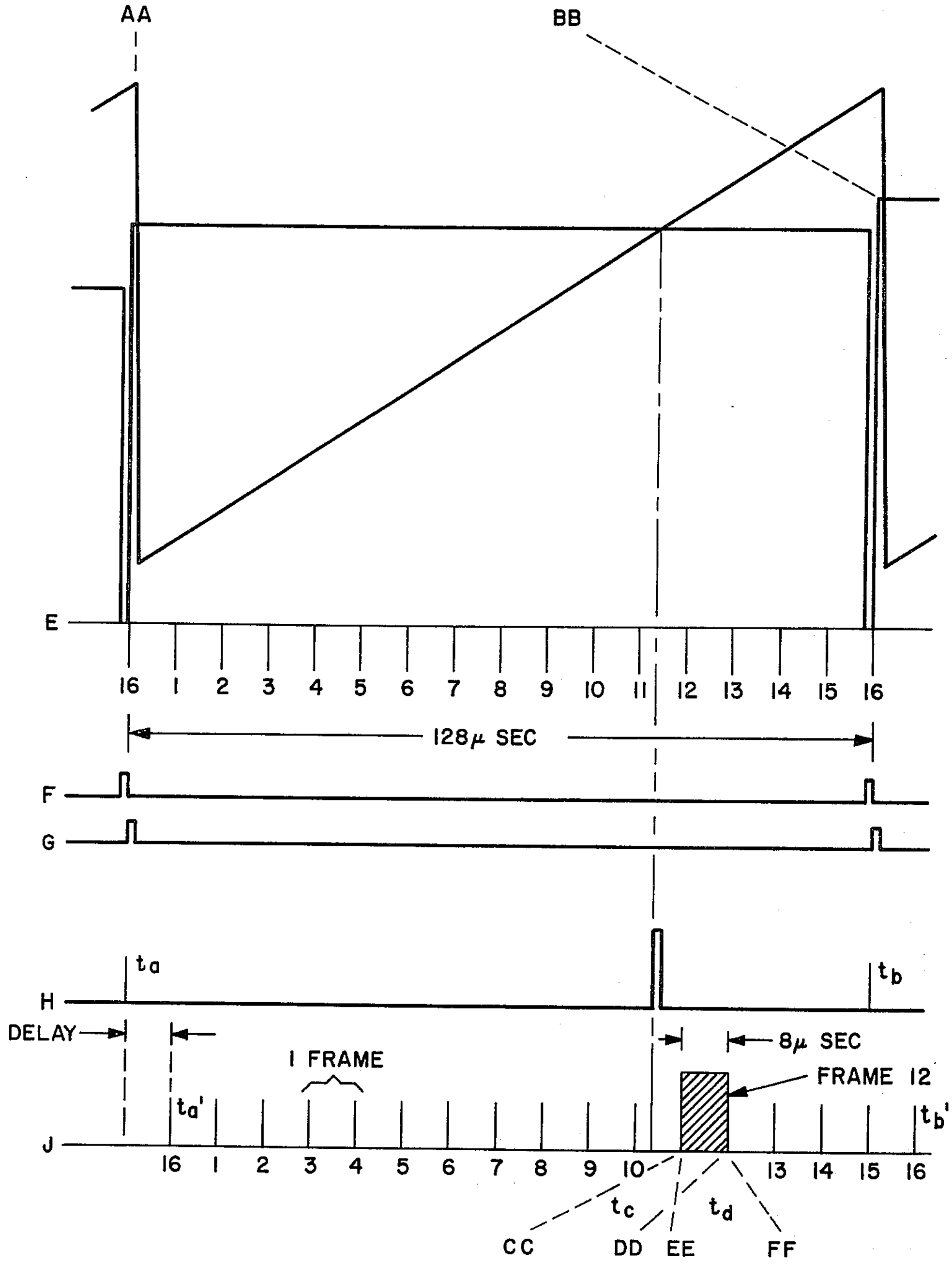
Figure 3C:
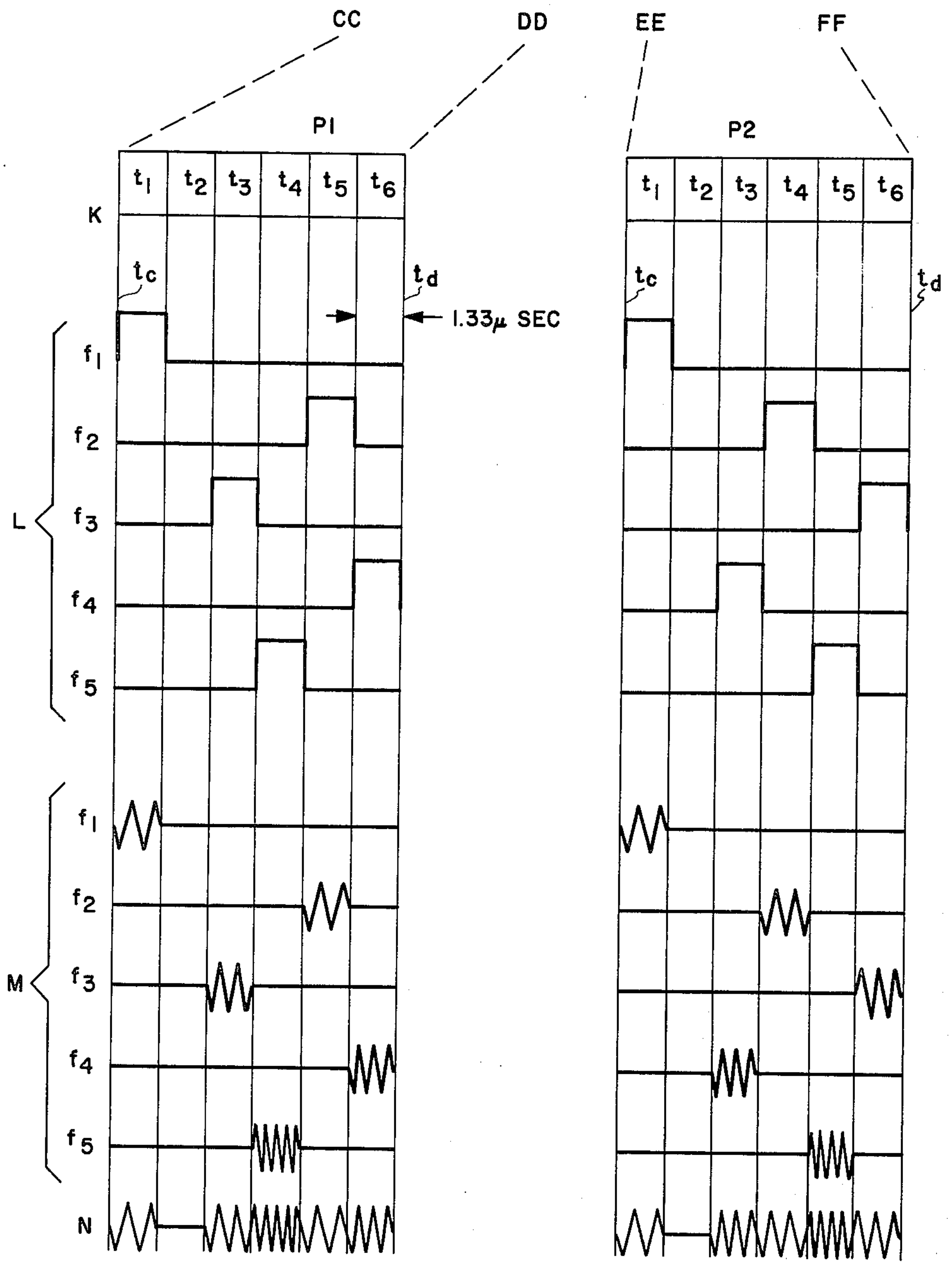
Figure 4:
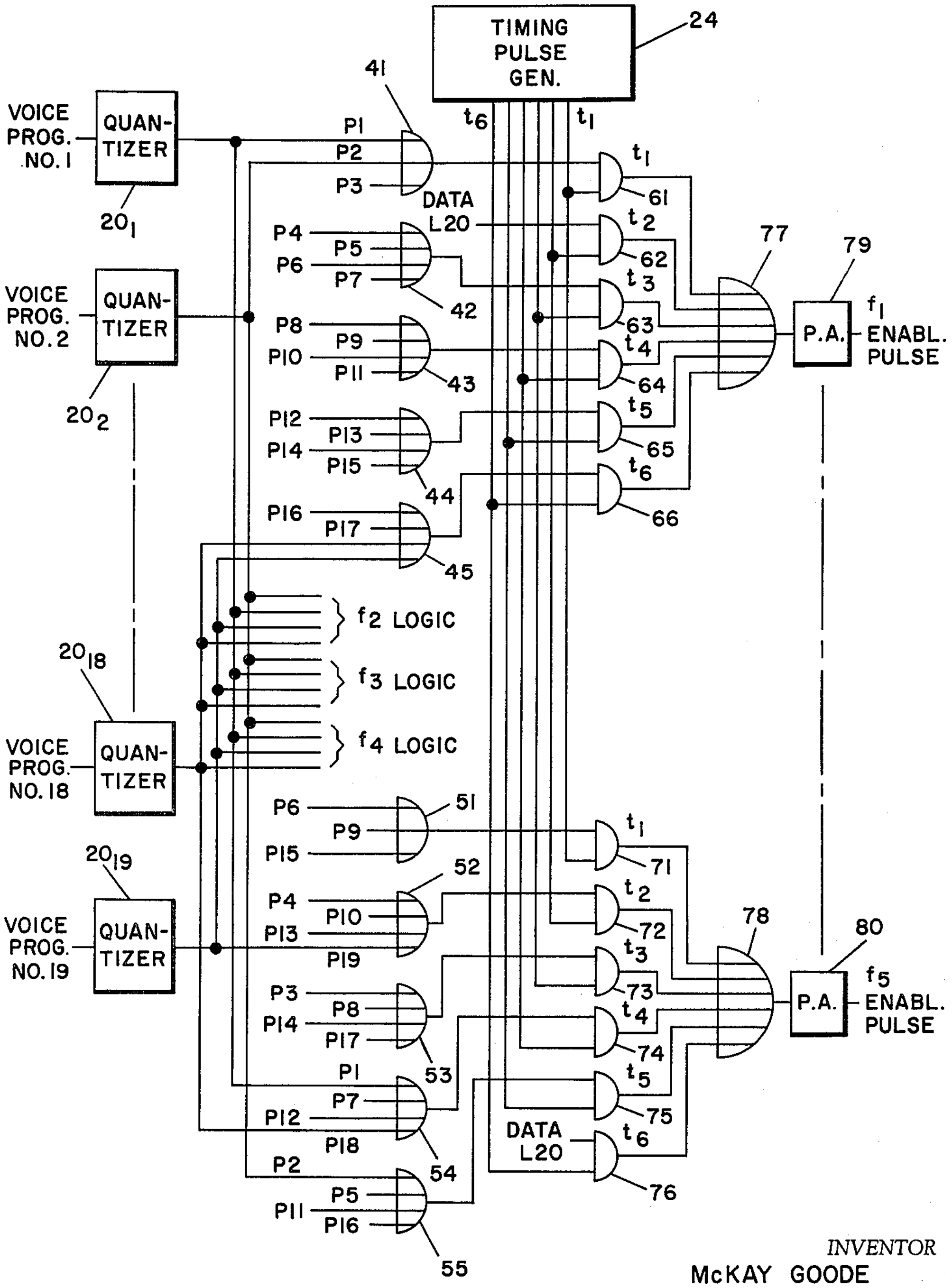
Figure 5:
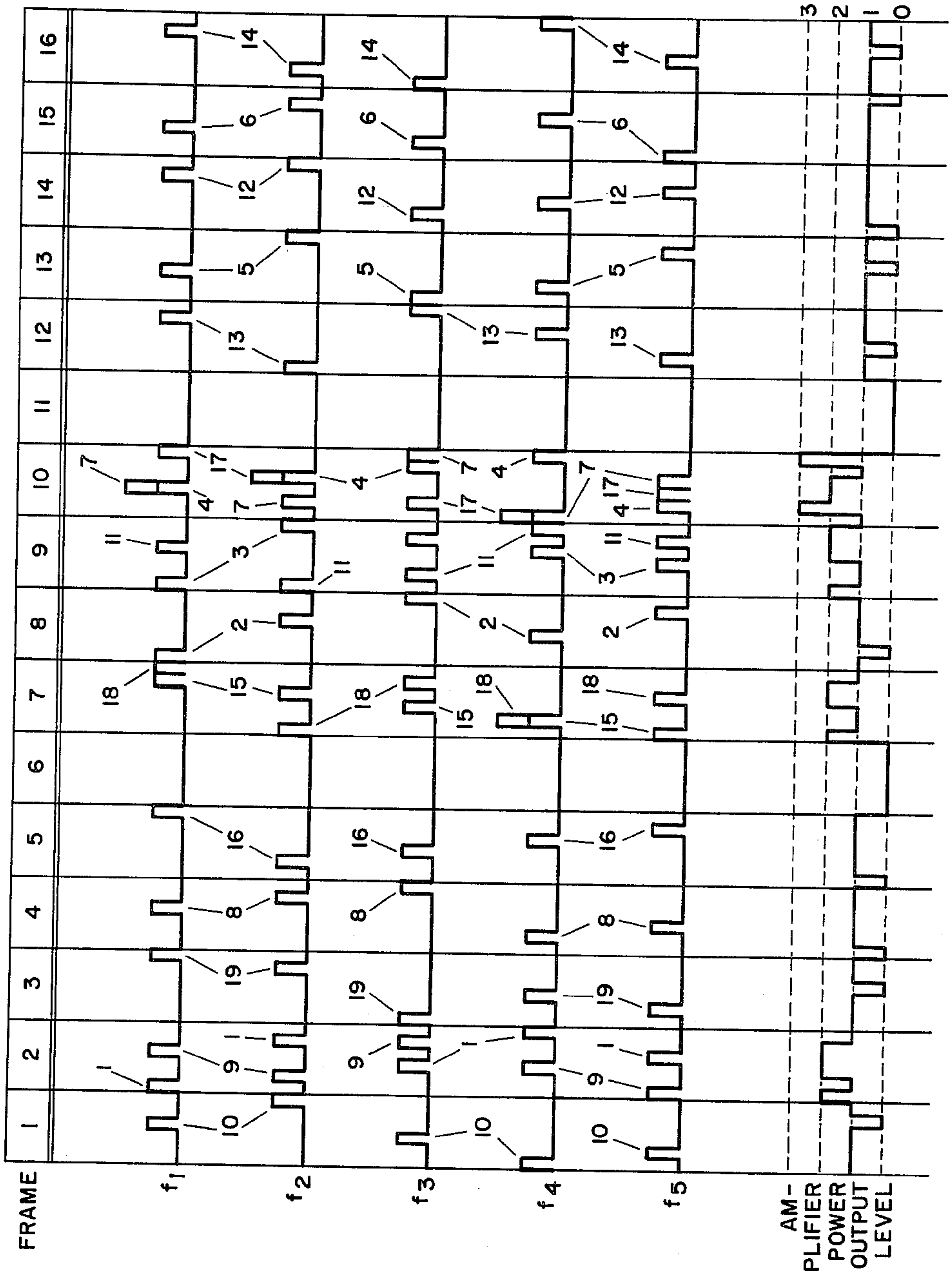
Figure 6A:
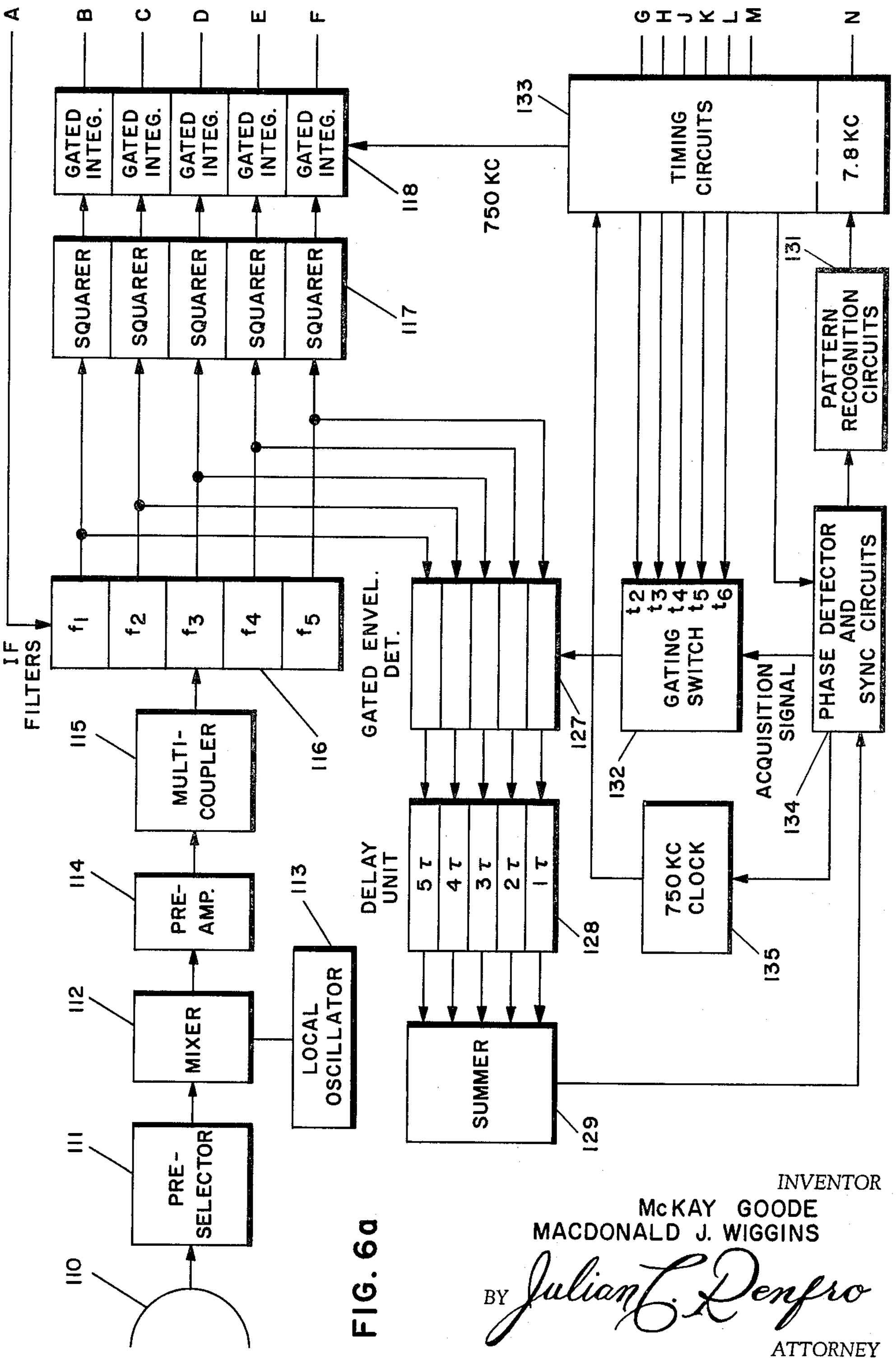
Figure 6B:
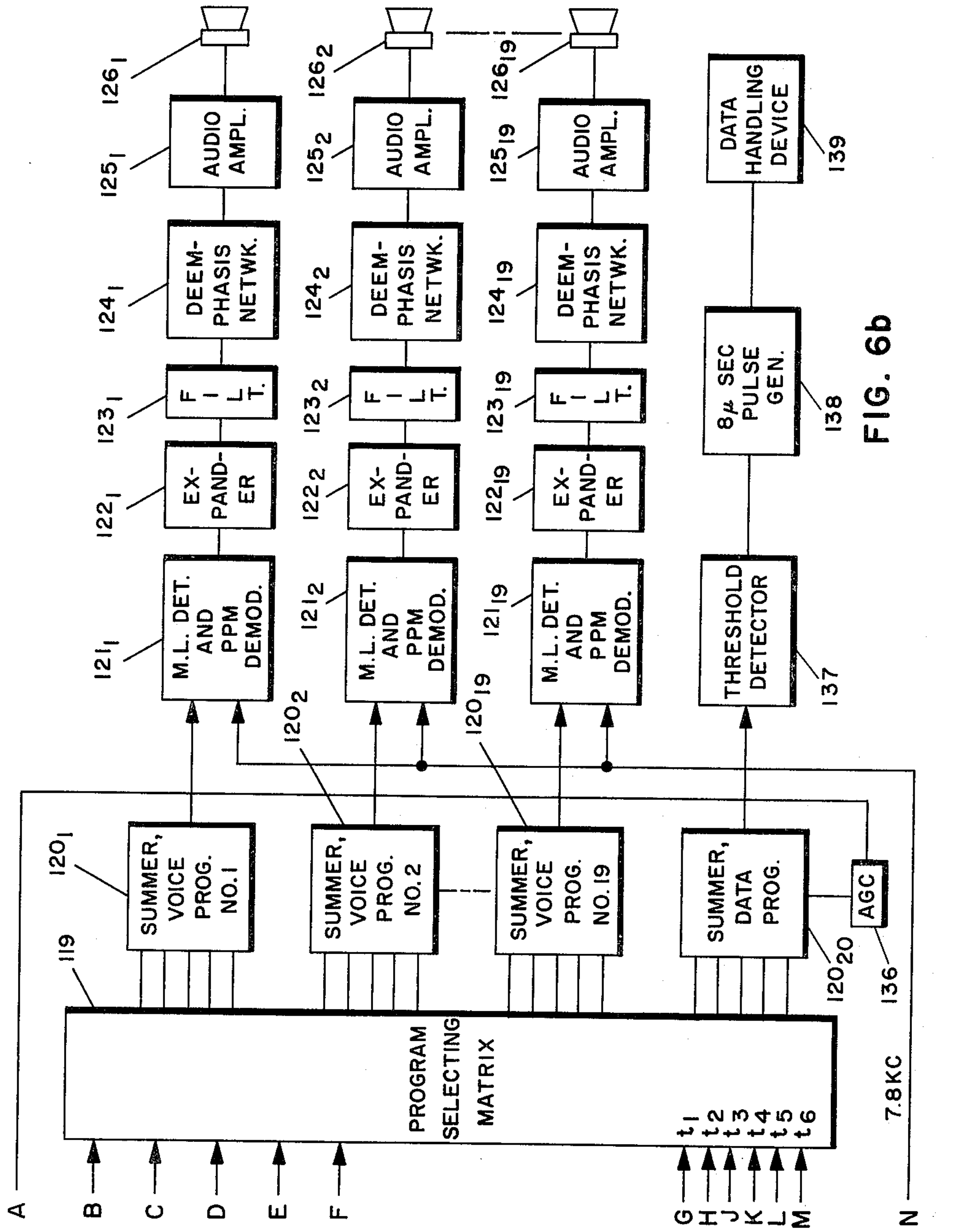

FIGURE 2 represents typical waveforms on the nineteen voice programs as delivered during a 128-microsecond sample period from the quantizers to the program selector matrix for a fully loaded system;

FIGURES 3*a*, 3*b*, and 3*c* represent a series of three closely related figures of drawing, with FIGURE 3*a* representing the input waveform, the quantizing thereof and the sawtooth timing wave;

FIGURE 3*b* represents that conversion of the intelligence of one of the sample periods of FIGURE 3*a* into pulse position modulated intelligence;

FIGURE 3*c* represents the output coding from two of the nineteen voice programs, illustrating the discrete codes that typify the output from each gated oscillator;

FIGURE 4 represents a wiring diagram in considerably abbreviated form of the matrix employed in the transmitter for receiving intelligence from the quantizers of the voice programs and for placing this intelligence in a multiplex type of arrangement upon five operating frequencies;

FIGURE 5 is an indication of the waveforms emanating from the program matrix, with the code pulse arrangements shown thereon reflecting the coincidental positions of the pulses indicated in FIGURE 2; and FIGURES 6*a* and 6*b* represent closely related views of the receiver employed for receiving the intelligence from the transmitter of this invention and for placing this intelligence upon nineteen transducers and a data handling device.

In the embodiment of the transmitter illustrated in FIGURES 1*a* and 1*b*, nineteen voice programs are to be understood to be represented by the inclusion of exemplary voice programs 1, 2 and 19. The twentieth program is provided for data, and as will hereinafter be seen, the data channel is employed for assuring synchronism of the receiver with the transmitter.

As to the operation of the 19 voice programs, a quantized pulse position modulation scheme is employed, and in order to achieve a high channel capaicty within the available bandwidths, only sixteen quantizing levels are used. It is well known that toll quality speech has in the past required approximately sixty-four quantizing levels. The use of this many levels in this troposcatter system would, however, greatly reduce its capacity because of the higher bandwidth per voice program necessary. It is therefore one of the important features of our system which allows the higher channel capacity stemming from the use of only sixteen quantizing levels. In other words, the saving in bandwith acomplished by the use of this smaller number of voice quantizing steps is reflected in an increase in the number of voice channels available. In order to obtain toll quality speech with one fourth the number of quantizing steps heretofore required, a unique voice processing method is used, which we will describe in detail.

Referring to exemplary voice programs 1, 2 and 19 shown in FIGURE 1, the first step in the processing of speech received by transducers 12 is accomplished in each channel by the audio frequency processing blocks identified as preamplifier 13, preemphasis 14, fast automatic gain control 15, and transmitter bandpass filter 16. The subscripts employed on FIGURE 1 in conjunction with these and other blocks are utilized to identify the respective voice program, and it will be understood that sixteen other voice channels, channels 3 through 18, are in accordance with our system disposed between voice programs 2 and 19.

The audio frequency signals from devices 12, which may be microphones are preamplified by conventional preamplifier circuits 13, and then are given a rising frequency response characteristic of 6 db per octave preemphasis characteristic by devices 14. The preemphasis operation has the effect of differentiating the audio signals, the result of this being the causing of the processed voice signals to cross quantizing levels, hereinafter discussed, more frequently than would otherwise be the case. This increasing of the quantizing level crossings occurring in normal speech is for the reason that normal speech involves a higher probability of low amplitude levels than of high amplitude levels. The probability distribution of speech is well known, being approximately gaussian, and ideal situation so far as quantizing is concerned would be if all amplitude levels were equally likely.

Therefore, it is a function of the voice processing to modify the voice amplitude distributions in such a fashion that this ideal is closely approached within a reasonable dynamic range.

The signal after preemphasis is fed to fast automatic-gain-control circuits identified on FIGURE 1 as $\mathbf{15}_1$, $\mathbf{15}_2$ and $\mathbf{15}_{19}$. The purpose of these circuits is to produce in each voice channel a uniform average audio level, irrespective of the loudness of the voice source, within a reasonable dynamic range. This ensures that subsequent circuits will receive the correct signal level for proper operation, and reduces the probability of overmodulation. The design of these circuits may be along the line of the invention of Lee Roy Brown set forth in patent application Serial No. 170,938, filed February 5, 1962, and assigned to the assignee of the present invention.

After the automatic gain control circuits 15, the signals pass through bandpass filters 16, mentioned earlier. These may be composite filters using constant K and M-derived filter setcions as is conventional in audio circuitry, and serve to limit the audio frequency signals from approximately 300 cycles to 3000 cycles.

From the audio frequency processing blocks 13–16 the signals drive instantaneous compressors 17. Each of these devices has an output-input transfer function which is approximately inversely proportional to the normal amplitude distribution per speech, and the effect of this transfer characteristic is to amplify the lower amplitude signal levels to a greater extent than the higher level signal. This operation achieves the goal of a uniform distribution to a good approximation of speech amplitudes.

The processed speech from the instantaneous compressors 17 is then sampled periodically and quantized. These operations occur in audio sampling and holding devices 18, pulse position modulators 19, and quantizers 20, as will be described hereinafter. In this particular embodiment, a uniform type sampling is used, the sampling rate being approximately 7.8 kc., with such timing pulses being available to the devices 18 through 20 from an external timing pulse generator 24 to be described as the description proceeds.

The audio amplitude at the time of sampling is held in the audio sampling and holding blocks 18, the purpose of this holding being to allow a pulse to be generated whose position in time is a measure of the sample amplitude. The pulse positioning is of course accomplished in the pulse position modulators 19.

A very narrow pulse, for example one microsecond, is generated in devices at the time of coincidence of a linearly-rising timing wave, which began at the time of sampling, with the amplitude of the held audio sample. This short pulse will therefore occupy a position in time proportional to the held sample amplitude. It is then necessary to quantize this time into one of 16 such time frames lying between the time of audio sampling of the presently held sample and the time for the next sample. It may be seen that this sampling period is exactly 128 microseconds, this being the reciprocal of the sampling rate of 7.8 kc. (actually 7.8125 kc.), thus each of the 16 time frames will be exactly 8 microseconds in duration. The 7.8 kc. sampling rate chosen is simply that which gives a balance between pulse width (bandwidth) and quality of sampled speech.

The quantizing of the pulse position is achieved in the nineteen voice channels by quantizers $\mathbf{20}_1$ through $\mathbf{20}_{19}$. It should be noted at this point that the output of the quantizers to the program selector matrix 23 shown on FIGURE 1*b* will be a series of 8-microsecond pulses, with one occurring in each successive 128 microsecond sample period, and whose position within one of the 16 discrete 8-microsecond time intervals in each 128-microsecond sample period represents the sampled audio signal amplitude. In other words, the sequence of pulses forms a quantized pulse position modulation pulse stream in each voice channel in use.

The frame occupied by the p.p.m. signal pulse for each period will be completely random from one voice program to another, this being desirable so that the available energy may be distributed more evenly in time thus lowering the maximum instantaneous power needed from the transmitter.

FIGURE 2 is a representation of typical waveforms on the nineteen voice programs, as delivered from quantizers $20_1$ to $20_{19}$ to the program selector matrix 23 for a fully loaded system. The time $t_a$ to $t_b$ of this figure represents a 128 microsecond sample period, whereas $t_c$ to $t_d$ represents an 8-microsecond frame time. A pulse ocurring in any given voice program appears in any one of the sixteen discrete 8 microsecond time frames contained in the 128 microsecond sample period $t_a$ to $t_b$. As shown in FIGURE 2 with regard to voice lines 1 through 19, the occurrence of these frames pulses is completely random from one voice program to the next, and frames 6 and 11 may for example be vacant, frames 2, 7 and 9 contain two pulses, and frame 10 three pulses.

Note that for voice program 13 the p.p.m. pulse happens to occur in frame number 12. This location was due to the particular instantaneous voice amplitude in that program at the time of sampling $t_a$. It can be observed from FIGURE 2 that each voice program delivered into the program selector matrix 23 will contain a pulse for only 1/16 of the time, and from line to line the pulses are randomly distributed in an approximately uniform fashion due to the statistics of the voice amplitudes.

The various pulse stream outputs from the voice programs therefore drive the program selector matrix 23, which is also supplied with a sequence of timing pulses from timing pulse generator 24. Latter device is shown in FIGURE 1*a* and produces D.C. pulses 1.33 microseconds wide. A 750 kc. stable clock 33 provides a basic timing signal to the timing pulse generator. A time-sequence of six of these 1.33 microsecond pulses coincides with each of the eight microsecond pulses which emanate from the quantized p.p.m. as described above. The timing pulse generator also produces a marking pulse identifying the beginning of each such set of six 1.33 microsecond pulses, latter information being fed to the quantizers 20.

In the implementation of the timing pulse generator 24, ring counters are advantageously used therein. Incident to their normal operation of producing the 1.33 microsecond subpulse timing pulses $t_1$ through $t_6$ from the 750 kc. stable clock 31 is the production by the ring counters of a series of eight microsecond pulses which occur sequentially at the exact times of the 16 time frames representing the quantized pulse positions.

Leads from various points in the ring counters are shown along the upper portion of the timing pulse generator 24, such that an 8 microsecond pulse occuring at the time of frame 1 of a sample period is available at the lead marked $F_1$. Similarly, the pulses occurring at each of the successive frames are available at leads corresponding to the frame numbers.

In the embodiment shown in FIGURE 1*a*, pulses $F_{15}$ and $F_{16}$ from frames 15 and 16 have been conveniently employed in the audio sampling and holding operation, and in the pulse position modulation process, as described more fully hereinafter, whereas the other leads have no specific use in this embodiment. However, it should be mentioned that certain variations of this invention may make use of these various pulses, such as for staggering the sampling times for the various voice programs in order to more evenly load the system.

With regard to the quantizers, it is required that each quantizer 20 produce an 8 microsecond pulse at its output which falls within one of the sixteen 8 microsecond frames of each sample period. The leading edge of a 1.33 microsecond pulse occurring in slot $t_1$ from the timing pulse generator 24 serves to mark the beginning of such 8 microsecond frames, thus assuring that the above requirement is met. This action will be explained in further detail with reference to FIGURE 3*c*.

The 1.33 microsecond pulses therefore break each 8 microsecond basic pulse from each voice program into six subpulses, each being 1.33 microseconds in duration. Since every 8 microseconds there are six outputs $t_1$ through $t_6$ from the timing pulse generator 24 fed on leads A through F to the program selector matrix, there is one 1.33 microsecond pulse on each of the six outputs that defines the six time slots.

The program selector matrix 23 mixes each p.p.m. pulse, whenever such a pulse arrives from a voice channel, with the six time slot pulses $t_1$ through $t_6$ from the timing pulse generator 24, such that the leading edge of the 8 microsecond p.p.m. pulse from a quantizer 20 coincides with the leading edge of the first 1.33 microsecond time slot pulse, hereinafter referred to as $t_1$, and the trailing edge of the p.p.m. pulse coincides with the trailing edge of time slot pulse $t_6$. This coincidence occurs because the leading edge of subpulse $t_1$ has been responsible for the initiation of the 8 microsecond p.p.m. pulse in each quantizer, being introduced therein as a result of a lead being connected from $t_1$ to each quantizer as indicated in FIGURE 1*a*.

It will be noted from FIGURE 1*b* that the output of the program selector matrix 23 is five lines driving five gated crystal oscillators 25. The oscillators generate five different frequencies $f_1$ through $f_5$, with $f_1$ being for example at a frequency of 140 megacycles, $f_2$ at 141.5 megacycles, $f_3$ at 143 megacycles, $f_4$ at 144.5 megacycles and $f_5$ at 146 megacycles.

The coincidence of an 8-microsecond pulse from one of the voice quantizers 20 with the six time slot pulses from the timing pulse generator 24 in the program selector matrix 23 causes, because of the matrix configuration used, a particular sequence of these 1.33 microsecond pulses to occur on the lines from matrix 23 to the five gated oscillators. For example, and as illustrated in FIGURE 1*b*, one combination might be that $f_1$ pulse occurs during the first time slot, $f_2$ pulse occurs during the fifth time slot, $f_3$ occurs during the third time slot, $f_4$ occurs during the sixth time slot, $f_5$ occurs during the fourth time slot, with a no-pulse occurrence during the second time slot. This is the code of voice program 1, and this sequence is unique to this program. The receiver hereinafter described will recognize this time frequency sequence as being that of voice program 1 and will pass it to the appropriate output, which rejects any other frequency-time sequence. The combination of the six time slots and the five frequencies allow 20 different programs to be generated with the constraint that no more than one time slot and frequency will be shared in common between any two voice programs, and also providing one program which does not share any of the time frequency combinations with any other program, this being the program used for data transmission. The receiver of course has a decoder and output for each of the twenty programs. Coding will be explained in greater detail hereinafter.

The five outputs from the gated oscillator ensemble 25 are combined in an adder 26. As will be observed in connection with FIGURE 3*c*, the signal appearing at the output of the adder due to the pulse stream from each voice program will consist of a sequence of five 1.33 microsecond radio frequency bursts, each being on a different frequency. This group of five occurs sequentially in a single 8 microsecond time frame, there being but one such frame for each voice program in each successive 128 microsecond sample period. When the signal is considered for all programs in operation, then each successive 8 microsecond frame may contain in a random fashion a five frequency burst signal whose time frequency coding is characteristic of the particular program which generated it. When the system is fully loaded with all programs in operation, the probability is high that signal bursts will occur in every time frame, and that occasional time frames will contain the pulses of two, or even three programs. However, it is emphasized that at most only one such frame in a single 128 microsecond sample period belongs to each program.

The frequency at which the gated oscillators 25 operate may for example and as previously mentioned be in the 140 to 150 megacycle region. This tropospheric scatter system may be used at ultrahigh frequency or microwave regions. Therefore, it is necessary to heterodyne the adder 26 output up in frequency to the desired output frequency. This may be accomplished by the use of mixer 27 and local oscillator 28. The local oscillator in a high stability oscillator which when mixed with the adder output, produces a frequency component at the mixer 27 output on the desired carrier frequency. A driver 29 increases the level of the mixer output sufficient to drive the power amplifier 30 to the required output level. The output necessary depends upon several parameters such as range, frequency, terrain and path loss. For example, one kw. may be used for medium range operation such as several hundred miles. A typical frequency which is established by the combination of the adder and local oscillator is in the 5 gigacycle range.

The output from the power amplifier 30 drives the antenna 32 through a diplexer 31. This diplexer allows the same antenna 32 to be used for the receiver portion of a duplex system, the separation between transmitter and receiver being achieved by virtue of a guard frequency band. For example, the transmitter might work on a frequency of 4.95 gc. and the receiver might work on a frequency of 4.8 gc. The diplexer would have sufficient attenuation at the transmitter frequency in order to protect the receiver input circuits from damage due to simultaneous operation of the transmitter on its frequency.

The antenna 32 may be typically a parabolic reflector antenna and with the restriction on its beam width of a minimum value to achieve a sufficiently narrow medium bandwidth required to insure decorrelation of the adjacent multiple frequencies. This beam width is determined by the particular range or scatter angle required.

As to coding, it is desirable in our troposcatter communication system to utilize the pulse position modulation scheme in the most efficient possible manner. Since the transmission of a particular voice program requires a pulse only 1/16 of the total sample period time, there exists a considerable amount of time available for transmission of other voice programs. Thus, various pulses which form such other voice programs may be arranged to interleave each other in time. In order that the receiver may separate the various pulses and distribute them into the separate receiver voice outputs, some form of code must be used. It is inherent in our system that we use five frequencies whose primary purpose is to provide a high degree of diversity. Advantageously, the same five frequencies may be additional utilized in accordance with this invention as part of the coding method for separating the voice channels as mentioned above. For the identification of a particular voice program, the order in which each of the five frequencies is transmitted is varried.

This coding is more easily illustrated by referring to Table 1 appearing hereinafter. As previously mentioned, each 8 microsecond pulse is broken into six subpulses each of 1.33 microsecond duration. The six subpulses identified as $t_1$ through $t_6$ serve as the Table 1 column headings, so for each of the twenty programs listed down the table, the combination of frequencies may be directly read. From the combination of six subpulses and five frequencies, there may be obtained five combinations of frequencies and subpulses in which there are no pulse-time combinations repeated between any of the five programs. These 5 combinations are identified as program numbers 4, 8, 12, 16 and 20. If the coding were restricted to these five programs then no crosstalk, that is, pulses from one program appearing in another program at the receiver, could occur. However, it is desired to obtain a high utilization of the system. Therefore, in this particular embodiment it has been expedient to use additional code points which allow a maximum of one time frequency pulse between any two programs. This change allows a total of 19 such programs plus one program whose time frequency coding is mutually exclusive. In Table 1 programs 1 through 19 are those having a maximum of one common pulse while mutually exclusive program 20 is reserved for transmission of data and synchronization information as described more fully later.

*Table 1*

| | $t_1$ | $t_2$ | $t_3$ | $t_4$ | $t_5$ | $t_6$ |
|---|---|---|---|---|---|---|
| 1 | $f_1$ | ------ | $f_3$ | $f_5$ | $f_2$ | $f_4$ |
| 2 | $f_1$ | ------ | $f_4$ | $f_2$ | $f_5$ | $f_3$ |
| 3 | $f_1$ | ------ | $f_5$ | $f_4$ | $f_3$ | $f_2$ |
| 4 | ------ | $f_5$ | $f_1$ | $f_2$ | $f_3$ | $f_4$ |
| 5 | $f_3$ | $f_4$ | $f_1$ | ------ | $f_5$ | $f_2$ |
| 6 | $f_5$ | $f_3$ | $f_1$ | $f_4$ | $f_2$ | |
| 7 | $f_4$ | $f_2$ | $f_1$ | $f_5$ | ------ | $f_3$ |
| 8 | ------ | $f_4$ | $f_5$ | $f_1$ | $f_2$ | $f_3$ |
| 9 | $f_5$ | $f_2$ | $f_4$ | $f_1$ | $f_3$ | |
| 10 | $f_4$ | $f_5$ | $f_3$ | $f_1$ | ------ | $f_2$ |
| 11 | $f_2$ | $f_3$ | ------ | $f_1$ | $f_5$ | $f_4$ |
| 12 | ------ | $f_3$ | $f_4$ | $f_5$ | $f_1$ | $f_2$ |
| 13 | $f_2$ | $f_5$ | ------ | $f_4$ | $f_1$ | $f_3$ |
| 14 | $f_3$ | $f_2$ | $f_5$ | ------ | $f_1$ | $f_4$ |
| 15 | $f_5$ | $f_4$ | $f_3$ | $f_2$ | $f_1$ | |
| 16 | ------ | $f_2$ | $f_3$ | $f_4$ | $f_5$ | $f_1$ |
| 17 | $f_4$ | $f_3$ | $f_5$ | $f_2$ | ------ | $f_1$ |
| 18 | $f_2$ | $f_4$ | ------ | $f_5$ | $f_3$ | $f_1$ |
| 19 | $f_3$ | $f_5$ | $f_4$ | ------ | $f_2$ | $f_1$ |
| 20 | ------ | $f_1$ | $f_2$ | $f_3$ | $f_4$ | $f_5$ |

To illustrate the coding methods in a slightly different manner refer to Table 2, wherein the columns represent the output frequencies $f_1$ through $f_5$. The time slot in which each frequency appears for a given program is indicated by the time slot number in the particular frequency column for that program. By cross referencing to FIGURE 3*c*, line L shows the manner in which the frequencies $f_1$ through $f_5$ are generated in the particular time sequence for programs 1 and 2 as set forth in Table 2.

*Table 2*

| | $f_1$ | $f_2$ | $f_3$ | $f_4$ | $f_5$ |
|---|---|---|---|---|---|
| 1 | $t_1$ | $t_5$ | $t_3$ | $t_6$ | $t_4$ |
| 2 | $t_1$ | $t_4$ | $t_6$ | $t_3$ | $t_5$ |
| 3 | $t_1$ | $t_6$ | $t_5$ | $t_4$ | $t_3$ |
| 4 | $t_3$ | $t_4$ | $t_5$ | $t_6$ | $t_2$ |
| 5 | $t_3$ | $t_6$ | $t_1$ | $t_2$ | $t_5$ |
| 6 | $t_3$ | $t_5$ | $t_2$ | $t_4$ | $t_1$ |
| 7 | $t_3$ | $t_2$ | $t_6$ | $t_1$ | $t_4$ |
| 8 | $t_4$ | $t_5$ | $t_6$ | $t_2$ | $t_3$ |
| 9 | $t_4$ | $t_2$ | $t_5$ | $t_3$ | $t_1$ |
| 10 | $t_4$ | $t_6$ | $t_3$ | $t_1$ | $t_2$ |
| 11 | $t_4$ | $t_1$ | $t_2$ | $t_6$ | $t_5$ |
| 12 | $t_5$ | $t_6$ | $t_2$ | $t_3$ | $t_4$ |
| 13 | $t_5$ | $t_1$ | $t_6$ | $t_4$ | $t_2$ |
| 14 | $t_5$ | $t_2$ | $t_1$ | $t_6$ | $t_3$ |
| 15 | $t_5$ | $t_4$ | $t_3$ | $t_2$ | $t_1$ |
| 16 | $t_6$ | $t_2$ | $t_3$ | $t_4$ | $t_5$ |
| 17 | $t_6$ | $t_4$ | $t_2$ | $t_1$ | $t_3$ |
| 18 | $t_6$ | $t_1$ | $t_5$ | $t_2$ | $t_4$ |
| 19 | $t_6$ | $t_5$ | $t_1$ | $t_3$ | $t_2$ |
| 20 | $t_2$ | $t_3$ | $t_4$ | $t_5$ | $t_6$ |

The various codes previously described are produced by the program selector matrix 23 and the particular frequency enabling pulses appear at the five outputs thereof. The pulses on these five outputs are connected to the input of corresponding gated oscillators 25. To describe the operation of a gated oscillator ensemble 25 the details of one of such oscillators will be given.

This oscillator operates, for example, in the 140 megacycle range and is of conventional design in that it utilizes a quartz crystal maintained in constant temperature for stability reasons by an oven and using a transistor as the active oscillator element. This oscillator has low output and this output is taken through a gating circuit. Normally this gating circuit shorts the oscillator output to ground in such a manner that no radio frequency output appears at the input to adder 26. An enabling pulse from the program selector matrix 23 serves to open the gate circuit allowing the oscillator radio frequency output to appear at the input of the adder. Thus a sequence of five enabling pulses corresponding to a particular program on the five respective program selector output lines will turn on the five gated oscillators 25 $f_1$ through $f_5$ in the proper time sequence. From FIGURE 1*b* an example of a particular code, that of voice program 1, is shown to more fully illustrate this action.

With reference to the pulse codes illustrated in FIGURE 1*b* at the output of the program selector matrix, FIGURE 5 will more fully explain this pattern.

The voice program #1 illustrated in FIGURE 1*b* may be found in frame 2 on FIGURE 5 and is identified by numerals 1 in this frame. However, FIGURE 5 is a more general representation of the system when it is fully loaded with all 19 programs. Thus there may be in fact more than one set of pulses in a given frame, such extra pulses being those from other voice programs. For example, in frame 2 in FIGURE 5 is may be noted to also contain a set of pulses from voice program #9.

As will be described more fully later, the RF pulses from the gated oscillators 25 are added in the adder 26, and the line in FIGURE 5 labelled Amplifier Power Output Level represents this operation. It may be seen that the radio frequency power level at the amplifier output varies randomly in discrete steps throughout this typical sample period.

Other voice programs are identified in FIGURE 5 by the numerals corresponding to the program number. The voice program pulses chosen to be illustrated in FIGURE 5 are those which were previously being used in FIGURE 2, so FIGURE 5 thus represents the original voice program pulses of FIGURE 2 after passing through the program selector matrix 23. FIGURE 5 also illustrates the random manner in which the subpulses from the various channels may overlap and share the time slots.

With respect to overlapping of pulses, a case is illustrated in frame 2 where two of the gated oscillators are turned on simultaneously. For example, in the first time slot of frame 2, program 9 turns on oscillator $f_5$, and program 1 turns on oscillator $f_1$. Therefore the power output below indicates a double level. This ultimately results in transmission of twice the peak pulse power than would be transmitted for a single pulse. A similar example may be seen from frame 10 wherein three oscillators are turned on simultaneously. The second time slot of frame 10 shows that program 7 gates on oscillator $f_2$, program 17 gates on oscillator $f_3$, and program 4 gates on oscillator $f_5$. Consequently, the power output is three times the single pulse output.

Another phenomena is also illustrated in FIGURE 5, namely that of pulse sharing. For example, in frame 7, program 18 turns on oscillator $f_4$ in slot 2 and program 15 also turns on oscillator $f_4$ in time slot 2. However, this coincidence results of course in only one RF burst from oscillator $f_4$; consequently, the power output is the level of a single pulse only, and this situation is known as power sharing. On a statistical basis, a small saving in average power results from such power sharing.

A fuller appreciation of the foregoing may be had from a study of FIGURES 3*a* through 3*c*, which illustrate a voice program as it progresses from its respective instantaneous compressor 17 through the program selector matrix 23, gated oscillator 25 and adder 26. Referring to line A of FIGURE 3, this waveform represents the processed audio signal appearing at the output of the instantaneous compressor 17. Line B represents the audio sampling operation performed in each audio sampling and holding device 18, which provides a uniform sampling of the instantaneous amplitude of the audio wave of line A, by sampling at the beginning of every 128 microsecond sample period. For example, $t_a$ represents the beginning of one sample period, and $t_b$ represents the end of that sample period and the beginning of the succeeding sample period.

The audio sampling and holding devices 18 each have two inputs from the timing pulse generator 24, so that such devices can be commanded to "sample" and to "dump." For example, as seen in FIGURE 1*a*, the sample pulse may be sent at the time of coincidence at AND gate 38 of the 8 microsecond, 7.8125 kc. pulse $F_{16}$ from generator 24 corresponding to frame 16, and the 1.33 microsecond, 125 kc. pulse corresponding to timing pulse $t_1$. Similarly, the dump pulse may be sent at the time of coincidence at AND gate 39 of the pulse $F_{15}$ corresponding to frame 15 and the pulse corresponding to pulse $t_6$, latter pulses of course having the same duration and frequency characteristics as pulses $F_{16}$ and $t_1$.

The spikes on line B of FIGURE 3 are equivalent to the audio wavefrom amplitudes, so these spikes therefore represent the amplitude at sampling times, such as at $t_a$ and $t_b$.

Line C represents the output of the holding circuit of AS&H units 18 which serves to hold the sample amplitude represented by line B until the time of the next sampling. As will be noted from the waveform on line C, the result is a stairstep-like waveform representing a sampled and held version of the audio waveform of line A.

Line D represents a linearly rising time waveform which begins at each sample period and continues until the next sample period at which time it is reset and begins anew. Thus, this waveform is in the form of a repetitive sawtooth, the period of which corresponds to the 128 microsecond sample period time. The timing wave is generated in the pulse position modulators 19 utilizing 7.8 kc. pulses from generator 24, which pulses occur simultaneously with the "sample" commands to the AS&H units 18. The timing wave begins at a negative voltage level equal to the most negative voltage level which may be obtained from the audio input waveform, and ends at a positive voltage equal to the most positive level which may be obtained from the audio input waveform. For the purposes of this illustration a D.-C. bias has been added to the audio waveform in line A; thus this bias represents the zero voltage axis in line D. Thus, it crosses the zero voltage axis at the center of the sample period time, $t_a$ to $t_b$. The use of a common timing input ensures that the p.p.m. devices will produce only one pulse during the period between sample and dump.

Line E, shown on FIGURE 3*b*, represents the combining of the held audio samples with the timing waveform of line D, this being illustrated by the substantial expansion, within guide lines AA and BB, of the time scale of one 128 microsecond sample period; for example, from $t_a$ to $t_b$ previously shown on line A. Lines F and G denote the occurrence of timing pulses, with the pulse of line F representing the dump signal to each AS&H circuit 18, and the pulse of line G denoting the retrace of the sawtooth of the timing circuit in each pulse position modulator 19 as well as denoting the command to the AS&H units to store new samples.

In this enlarged waveform illustration of line E, one sawtooth of the series is shown superimposed on an enlargement of the respective held audio sample of line C. At the time at which the amplitude of the sawtooth coincides with the held audio sample, a trigger circuit produces a short triggering pulse of about 1 microsecond, this pulse being indicated on line H. It may be seen that the position of this pulse is a function of the amplitude of the held audio wave and would be in a different position for a different amplitude. If the instantaneous amplitude is zero, this narrow pulse would be in the center of the sample period $t_a$ to $t_b$. If the held audio sample were negative, then this pulse would be in the first half of the sample period, and in the last half if the sample be positive, so it is to be seen that a pulse may appear at any point in a sample period of this continuous pulse position modulation scheme. In the example shown, the held audio signal is positive, so therefore the pulse occurs in the second half of the sample period.

It is now necessary to quantize the pulse position into one of 16 discrete time intervals lying between $t_a$ and $t_b$, and line J shows the result of this operation, which, as previously mentioned, is performed by the quantizer 20. For the example shown, the pulse of line H fell within quantizing level 12 (which is actually the level between 11 and 12), so the quantizer produces from this pulse an eight microsecond pulse disposed in frame 12.

The output of the quantizer is delayed one quantizing time period or frame as shown on line J. The purpose of this delay is to allow the pulse from the p.p.m. device to occupy an entire 8 microsecond desired frame even though the 1 microsecond triggering pulse occurs near the end of this frame. In other words, it provides a short term memory of the position of the triggering pulse. For the example shown, inasmuch as the triggering pulse fell in frame 12, an 8 microsecond pulse is generated by the quantizer 20 in frame 12 as shown in line J, despite the delay. Each sample period of each voice program therefore will contain only one 8 microsecond pulse whose position is a quantized measure of the amplitude of the audio signal at the beginning of that particular sample period. From the quantizers the 8 microsecond pulses appearing once in each 128 microsecond period are fed to the program selector matrix 23 in the manner discussed hereinbefore.

In addition to receiving the inputs from the nineteen voice programs of the data program, the program selector matrix also receives a series of inputs from timing pulse generator 24, as was also discussed before. The 1.33 microsecond pulse appearing on each of the six inputs from the timing pulse generator 24 in sequence from $t_1$ through $t_6$ and repeating every eight microseconds is illustrated in expanded form on line K as the pulses $t_1$, $t_2$, $t_3$, $t_4$, $t_5$ and $t_6$ extending from $t_c$ to $t_d$. The coincidence in the program selector matrix 23 of the 8 microsecond pulse from each voice program with this set of six subpulses serves to generate, for each voice program, its preestablished sequence of 1.33 microsecond pulses on the five output lines from the program selector matrix 23 to the ensemble of gated oscillators 25. Each of the gated oscillators produces a separate frequency labelled $f_1$, $f_2$, $f_3$, $f_4$ and $f_5$ respectively.

Referring to line L it may be seen that the time sequence within a particular 8 microsecond frame $t_c$ to $t_d$ in which the 1.33 microsecond gating pulses appear with respect to the five oscillators is determined by the voice program from which the original 8 microsecond frame pulse arrived, this sequence being generated within the program selector matrix 23. For example, as shown in line L, program 1 produces a pulse at gated oscillator $f_1$ input during time slot $t_1$, no pulse during slot $t_2$, a pulse at the input of oscillator $f_3$ during slot $t_3$, a pulse at the input of oscillator $f_5$ during slot $t_4$, a pulse at the input of oscillator $f_2$ during slot $t_5$, and a pulse at the input of oscillator $f_4$ during slot $t_6$. It is emphasized that this order of time and frequency is the coding or signature of program 1. To illustrate this further, the particular coding chosen for voice program 2 is also illustrated on line L, and can be seen to be in the order $f_1$ in slot $t_1$, $f_4$ in slot $t_3$, $f_2$ in slot $t_4$, $f_5$ in slot $t_5$, and $f_3$ in slot $t_6$. Each of the other voice programs have, in accordance with this invention, a different time frequency sequence, as will be noted from Tables #1 and #2 above.

The individual gated oscillator outputs which occur whenever the enabling pulses appear at the gated oscillator input are illustrated on line M. Thus the bursts of radio frequency energy at these individual oscillator outputs follow the same time-frequency pattern as the enabling pulses appearing at their input. These five outputs are combined in a linear adder 26 as shown in FIGURE 1*b*, whose combined output is illustrated by line N. Note that this output represents a carrier frequency which may be considered to be changing or stepping in frequency between each successive 1.33 microsecond time interval for which a signal pulse was present at the output of the gated oscillator ensemble 25. It should be noted that the output of voice program 1 and voice program 2 illustrated on line N, while appearing superficially similar, are actually unique, since the time-frequency order of these bursts is different and this difference is recognized at the receiver as identification of the two different voice programs, as will be more fully described hereinafter.

Where two programs have their quantized p.p.m. pulse occurring during the same frame, such as, for example, in frame 12 on line J, then two gated oscillators may be turned on simultaneously. For example, for program 1 and program 2 illustrated on lines L and M, it may be noted that in the third time slot, both $f_3$ and $f_4$ are present simultaneously. Again, the receiver circuits will perform the necessary separation in order to distinguish the two voice programs 1 and 2.

The use of six time slots with the five frequencies, rather than only five time slots for this number of frequencies provides an unambiguous extension of the program coding. By leaving one time slot empty in each program, there results in a substantial increase in the number of programs possible, and also makes possible one program with no crosstalk, which is used for data transmission.

Referring to FIGURE 4, an abbreviated detailed version of the program selector matrix 23 is there presented, in this instance showing the quantizers $\mathbf{20}_1$ and $\mathbf{20}_2$ of voice programs 1 and 2, as well as quantizers $\mathbf{20}_{18}$ and $\mathbf{20}_{19}$ of voice programs 18 and 19, which represent typical quantizers associated with the nineteen voice programs; and showing details of the logic circuits concerned with $f_1$ and $f_5$ which are typical of the other three logic circuits associated with $f_2$, $f_3$ and $f_4$.

As discussed hereinbefore and as depicted in FIGURE 1*b* and FIGURE 3, five carrier frequencies, $f_1$ through $f_5$ are utilized according to this invention. Each of the nineteen quantizers are arranged to direct pulse information representing the same intelligence to each frequency channel. Each voice program channel has five OR gates to receive the quantizer inputs, with each quantizer being connected to such preestablished OR gate of each frequency channel.

Space does not permit all of the frequency channel components to be depicted in FIGURE 4 although this figure does illustrate in some detail the logic of frequency channels $f_1$ and $f_5$. As will be noted, all of the quantizers are connected to certain OR gates of each carrier frequency, with quantizer $\mathbf{20}_1$ being connected to OR gate 41 of channel $f_1$ and to OR gate 54 of channel $f_5$, as well as to three OR gates not shown, associated with the generation of frequencies $f_2$ to $f_4$.

Similarly, quantizer $\mathbf{20}_2$ is connected to OR gate 41 and to OR gate 55, quantizer $\mathbf{20}_{18}$ is connected to OR gates 45 and 54, and quantizer $\mathbf{20}_{19}$ is connected to OR gates 45 and 52, these quantizers of course also being connected to specific non-illustrated OR gates of channels $f_2$, $f_3$ and $f_4$.

Inasmuch as there are but five OR gates for each channel to receive the 19 voice programs, either three or four voice programs are connected to each OR gate. This is to be observed in FIGURE 4 wherein programs 1 through 3 are connected to OR gate 41, programs 4 through 7 connected to gate 42, programs 8 through 11 connected to gate 43, etc., with somewhat similar groupings of programs being connected to all of the OR gates of the remaining programs.

The data program inputs L20 do not require an OR gate since the coding is mutually exclusive as previously described in connection with Table 1. For that reason, the data inputs L20 go directly to the AND gates associated with the time slots for each of the five frequencies. For example, for frequency $f_1$, the data input goes directly to AND gate 62, and for frequency $f_5$, the data input goes directly to AND gate 76.

From each OR gate the voice program information is delivered to an associated AND gate. There are six AND gates 61 through 66 associated with frequency $f_1$, five of which receive inputs from the OR gates, in the manner depicted, whereas AND gate 62 receives, as just mentioned, the data program of that frequency channel. Similarly, AND gates 71–76 are associated with frequency channel $f_5$, with AND gate 76 receiving the data program, and the remainder receiving the OR gate outputs. Since the five AND gates of each channel are in effect receiving information from three or four voice programs, there is a possible opportunity for unwanted crosstalk to take place, whereas in the sixth or data AND gate of each frequency channel, this crosstalk cannot occur.

The AND gates 61–66 of channel $f_1$, AND gates 71–76 of channel $f_5$, as well as the AND gates of frequencies $f_2$ through $f_4$ are arranged to receive time slot information from timing pulse generator 24 in order to carry out the preestablished time-frequency coding for each of the twenty programs, as discussed in conjunction with FIGURE 3*c* and Tables 1 and 2. When an 8 microsecond pulse from an OR gate, for example 41, is present on its associated AND gate, in this example 61, a 1.33 microsecond pulse will be gated out to the output OR gate 77, during the time slot for which a 1.33 microsecond timing pulse is also present at the AND gate 61; for this example during time slot $t_1$. The 1.33 microsecond pulse outputs from the AND gates are fed through an OR gate 77, and thence delivered to a pulse amplifier 79, which puts out what may be termed an enabling pulse of 1.33 microsecond duration, which serves to turn on the respective gated oscillator 25. Similarly, the other logic circuits $f_2$ through $f_5$ also produce such oscillator enabling pulses when the proper coincidences occur in these logic circuits. For frequency channel $f_5$, the AND gates deliver their outputs to OR gate 78, the outputs of which are converted to enabling pulses by the action of pulse amplifier 80.

The manner in which this is accomplished will perhaps be made clear by reference to FIGURE 5, which represents the pulse information appearing in the sixteen frames of a typical 128 microsecond sample period. In accordance with the arbitrary and illustrative pulse program appearing in FIGURE 2, FIGURE 5 has been created so as to plot the code of each particular voice channel in accordance with the position of the pulses of FIGURE 2. For example, in frame 1 of the exemplary period of FIGURE 2, a pulse appears in program 10, so therefore, frame 1 of FIGURE 5 shows five 1.33 microsecond pulses plotted in the characteristic pattern of program 10.

As will be seen from a study of FIGURE 5, frames 6 and 11 may, in accordance with FIGURE 2, contain no information, whereas some frames may contain two programs, and one or more frames contain the pulses from three or more programs, such as frame 10, which for the illustrative instance chosen, contains the pulses from programs 4, 7 and 17.

It should be noted that the coding of each program is worked out in such a manner that in not more than one instance in any one 128 microsecond sample period are pulses from any two programs in the same time slot. This is to say, although pulses from programs 7 and 17 occur in the first time slot in frame 10, pulses from these two programs do not coincide in any other time slot in this 128 microsecond sample period.

Turning to a detailed description of the receiver of the tropospheric scatter signaling device as depicted in FIGURES 6*a* and 6*b*, the input to the receiver is a parabolic antenna 110 which feeds a preselector 111 with the received radio frequency energy which in this instance is in the form of the multifrequency pulse type signal transmitted by the transmitter portion of the system. Preselector 111 serves to restrict the bandwidth of the received signals to only those frequencies transmitted, to minimize noise and interference. The signal is transferred from the preselector to the mixer 112 wherein the signal is heterodyned with radio frequency energy generated by a local oscillator 113. For example, the received signal may lie in the frequency range from 4.4 to 5 gigacycles. The mixer 112 and local oscillator 113 translate this frequency to the range from 55 to 65 megacycles.

A preamplifier 114 overcomes the losses encountered in the mixer 112 and serves to build up the signal strength sufficiently to drive the multicoupler 115. The multicoupler drives an ensemble of five intermediate frequency filter amplifiers 116. Each of these filters is tuned to the frequency of one of the five different frequency subpulses and has sufficient bandwidth to pass the corresponding subpulses.

The intermediate frequency utilized may be for example in the 55 to 65 megacycle range, as mentioned beforehand. Thus outputs of the IF filter 116 have generated a sequence of five frequencies lying in this range with the same separation which was present at the transmitter.

The amplitudes of these pulses are varying in a random fashion due to the nature of the tropospheric scatter medium. These variations are of two types, namely, a rapid variation with a rate of approximately 10 cycles per second and a slow variation with periods of greater than 10 minutes. The receiver effectively compensates for the rapid random signal variations which are uncorrelated to a certain degree from one of the subpulse frequencies to another by the method of squaring, integrating and summing. The effects of the slow random variations are compensated for by means of an automatic gain control 136 shown in FIGURE 6*b*, the input for which is obtained by a long time average of the output of summer $\mathbf{120_{20}}$, hereinafter discussed. The output of the AGC 136 is applied by lead A in FIGURE 6*a* to the ensemble of five IF filters 116 to accomplish this compensation by varying the gain of the filters 116 inversely to the combined detected signal.

Of the twenty programs implemented in the present system, nineteen of these programs are utilized for voice transmission, and one program is utilized for data transmission, as previously mentioned. The data transmission channel may have pulses in any expected time interval rather than only one in each sixteen as described earlier for the voice programs. This channel will be discussed hereinafter.

The outputs of IF filters 116 are squared in an ensemble of five squarers 117. The purpose of this ensemble is to produce five signals each of whose average value is proportional to the energy contained in its respective IF filter output, and in such respect performs as a detector. The averaging operations necessary to measure such energies is performed in an ensemble of five gated integrators 118, each associated with a squarer, which are turned on at the beginning of each time slot (sub-pulse) and dumped at the end of each slot.

The foregoing detection will now be described in more detail. In the tropo scatter receiver a particular program for example P–1 having a p.p.m. pulse present at the input of the IF filters $f_1$ through $f_5$ will produce at the output of these filters a 1.33 microsecond pulse of I-F energy in the particular time slot as representative of this program. Thus, the output of a filter such as $f_1$ will consist of one burst of I-F energy for 1.33 microseconds during the eight microsecond frame time. This signal burst is applied to a respective squaring circuit of the squarer ensemble 117. This squaring circuit operates to produce a new signal, always positive going due to the squaring action, whose average D.C. level is thus proportional to the average power of the I-F input. The squaring circuit is followed by a corresponding gated integrator. This gated integrator of ensemble 118 has no output level at the beginning of the time slot containing the I-F signal. It integrates or builds up a voltage output as a function of time proportional to the accumulated area under the squarer output signal, which in effect measures the total area under the averaged D.C. pulse from this squarer. At the end of this 1.33 microsecond time slot, the gated integrator output can be seen to be a voltage directly proportional to the area under the squared signal, thus representing the energy contained therein since integration of a power function in time yields energy.

This voltage proportional to the signal energy is transferred to the program selecting matrix 119 of FIGURE 6*b* for use in the decoding process. Referring to the IF filter output for example, $f_1$, during the other five time slots previously mentioned, assume that there are no other program signals present. Thus, the output of the filter $f_1$ during these time slots will be random gaussian noise. The squarer will, of course, square these noise signals, and the gated integrator will also measure the energy contained in each noise signal for each of the five time slots. It should be noted that the D.C. level out of the gated integrator for noise will be low as compared to the output an actual signal.

For this example, voice program P1 has been considered in the description of the transmitter and referring specifically to FIGURE 3*c*, it was seen that a particular pattern of frequencies and time slots were used to provide a unique code for this program. As shown in FIGURE 3*c*, a replica of this frequency pattern will occur at the outputs of IF filters $f_1$ through $f_5$ in the time slots as transmitted. Each filter has a squared and gated integrator as previously described for IF filter $f_1$. The outputs of these gated integrators 118 for each time slot appears at the input of the program decoding matrix 119, and the matrix inspector the gated integrator level in the proper time and frequency order to recognize voice program number P1 when such program does occur and to reject as far as the program P1 output channel is concerned, all other programs.

The outputs of the gated integrators are connected by leads B through F to the program selecting matrix as shown in FIGURE 6*b*. This matrix is of the same general design as the program selector matrix in the transmitter, the receiver matrix utilizing AND and OR gates similar to those described earlier in FIGURE 4. In fact it may be noted that the program selecting matrix 119 is essentially the inverse of the program selector matrix 23 of the transmitter in that the input of the former is a set of five pulses on the lines B through F, which pulses originated from the detection of five frequencies, and its output is a set of twenty different signal programs. Six similar 1.33 microsecond timing pulses $t_1$ through $t_6$ from the timing circuits 133 are used in coincidence with five input pulses from the squarers 117 and gated integrators 118 to distribute the incoming programs to their respective output channels.

In order to more fully understand the subsequent operation of the voice detectors and data detector, a detailed functional description of this distributing operation will be given.

For example, consider the time slot $t_1$. During this time, a 1.33 microsecond pulse on line G is received at the matrix 119. This pulse will cause the detected energy present in filter $f_1$ arriving at the matrix 119 on line B, to be connected, by means of the AND and OR gates associated with line B, to the summers 120 of voice programs 1, 2 and 3, as set forth in Table 1. It should be noted that at any particular $f_1$, there may, or may not be a signal present in $f_1$ at time $t_1$, so that the voice summers receive either a voltage proportional to signal energy, or else to noise energy, as the case may be.

Furthermore, the logic design of the matrix 119 is such that none of the other program summers are connected to line B from $f_1$. However, these other programs are similarly connected to either line C from $f_2$, line D from $f_3$, line E from $f_4$, or line F from $f_5$ as required in Table 1 for each of these other programs.

Furthermore, the other time slots which occur in following sequence $t_2$ through $t_6$ distribute the five inputs to the proper summers in the same general manner as described for $t_1$ as required by the program coding of Table 1. Thus, at the end of a $t_1$ through $t_6$ sequence, which is of course a time frame of 8 microseconds, each summer $\mathbf{120_1}$ through $\mathbf{120_{20}}$ will have held each voltage signal impressed upon it by the matrix in five of the six time slots, and will produce an output pulse whose voltage amplitude is proportional to the sum of these five voltages.

It may be seen that for the case of noise only, this summed voltage would be low compared to the value if there were a true signal in each of the five time slots. Similarly, where a crosstalk pulse occurs in one time slot and noise in the other four time slots, the output voltage will still be much lower than for the true signal cases.

More specifically, the energy in each of the five subpulses as noted by each of the five gated integrators 118 and as summed in the summers produces an output pulse whose amplitude is proportional to the sum of the energy in each of the five subpulses. During a time interval when a particular program pulse is expected, there may be no such pulse due to the nature of the transmitted information. At such time the summer output pulse voltage will be proportional to the noise and interferring pulses. For transmitted voice, a correct pulse will arrive once for each sixteen pulse periods. Thus the output of the summers 120 is a train of correct pulse occurring during one-sixteenth of a total period, plus random smaller noise and interferring pulses.

The maximum likelihood detector portions of each of the maximum likelihood detector and p.p.m. demodulator devices 121 stores the amplitude of each correct pulse, noise pulse and interfering pulse during each sample period and makes a decision, not based upon threshold, but rather based on the premise that from a comparison of all pulses received during a sample period, the intelligence bearing pulse can be identified by its higher amplitude. A staircase timing waveform in each MLD serves as a discrete step timing voltage to identify the time of arrival of the correct pulse with reference to the beginning of the sample period. This staircase waveform accomplishes this action by producing an output voltage proportional to such time of arrival, that is, a maximum pulse arriving late in a sample period generates a small output, whereas a pulse arriving early in a sample period, which if not followed in that period by a pulse of greater amplitude, generates a proportionately larger output. This voltage is held from the end of one sample period to the end of the following sample period, at which time the next sample voltage occurs. Thus the output of each MLD 121 is a boxcar type audio waveform which is identical to the sample and quantized audio waveform transmitted by the transmitter section of the system. Stated in other words, at the end of each period a voltage proportional to the time of arrival of the correct pulse is generated with appropriate readout and storage devices being employed so that from the outputs of a succession of sample periods, an increasing and decreasing waveform is created, representing a reproduction of the original signal at the transmitter taken at a particular point in the original modulation process. The details of invention are set out at length in the copending patent application entitled Maximum Likelihood Detector filed February 6, 1962, Serial No. 171,494, now Patent No. 3,212,014 in the name of M. J. Wiggins and L. C. Layfield, and assigned to the assignee of the present invention.

The boxcar type audio waveform is processed in the audio section following each maximum likelihood detector 121. This process partially restores the dynamic range of amplitudes of the original audio signal by means of an expander 122. A bandpass filter 123 removes the high frequency components of the boxcar type waveform and the effects of the sampling process. The deemphasis network 124 restores the frequency-amplitude relationship approximating the original audio signal. The audio amplifier 125 increases the audio signal level sufficient to drive a telephone line or audio transducer 126, such as a headset, loudspeaker or audio recording device.

The program selector matrix 119 also feeds the data program 20 to a data program summer $120_{20}$. The output of this summer is examined by a threshold detector 137 whose threshold is chosen in accordance with the system design and is a function of the acceptable error rate and desired system threshold. The purpose of the threshold detector 137 is to examine the output level from the summer $120_{20}$ at the end of each 8 microsecond frame and make a decision as to signal present or signal absent. The condition of signal present will cause the generation of new or reconstituted 8 microsecond pulse at the output of the pulse generator 138. This would correspond to a mark signal. A decision of no signal present in an 8 microsecond frame will result in no signal out of the pulse generator 138 corresponding to a space condition. Thus a stream of mark and space pulses corresponding to the original data pulse stream at the transmitter will emanate from the pulse generator 138. Ordinarily, this will represent time division multiplexed data and may be handled as required by external data handling equipment. An example of data handling device may be a time division demultiplexer feeding a bank of teletypewriter terminals.

Returning to the data program summer $120_{20}$, the output from this summer represents a fifth order diversity base-band combined signal. Thus the effects of the rapid fading characteristic of the troposcatter medium will have been eliminated or reduced to a major degree. However, the slow fade, which is another characteristic of the troposcatter medium, will result in the mean value of the combined signal varying at a slow rate. In order to compensate for this, the summer signal is utilized to provide automatic gain control by means of the AGC circuits 136. A control voltage is developed proportional to the mean value of the summer output signal and is fed by a circuit from AGC 136 back to the IF filter amplifiers 116, thereby achieving the desired control. The gain of the IF filters 116 is achieved by means of conventional gain control circuits.

It has been explained that the gated integrators 118 operate at the correct times due to timing signals being received from the timing circuits 133. It is apparent that exact synchronization between the transmitter timing circuits and the corresponding receiver timing circuits is necessary for proper operation of the gated integrators and the program selecting matrix for operating the various signal channels. To insure this exact correspondence, means have been provided to lock the receiver timing reference clock 135 with the transmitter reference clock. This is accomplished as described before by using the frequency and phase information inherently contained in the random data pulse train transmitted over the data channel.

Referring to FIGURE 6*a*, the operation of the circuitry which provides this synchronization will be apparent. First the operation of the system will be described in the condition of normal operation. This presupposes that synchronization has been obtained and the method of initial acquisition will be explained more fully hereinafter. A separate signal channel is provided for the synchronization processing and may be noted as gated envelope detectors 127, delay unit 128, and summer 129. The outputs form the five IF filters 116 are envelope detected in the gated envelope detectors 127 which are turned on, or gated, in correspondence to the coding used for data. A gating switch 132 provides this turn on operation by receiving the necessary timing signals from the timing circuits 133. At the output of each gated envelope detector 127 there will be 1.33 microsecond D.C. pulses on each of the five output lines. These will have relative time delays corresponding to the data program code. It is desired to bring these five pulses into time coincidence, and this is accomplished by means of delay unit 128 which provides time delays inverse to the relative delay in each of the five frequency channels. For example, the detected pulse from filter $f_1$ is delayed five 1.33 microsecond periods, the detected pulse from filter $f_2$ is delayed four time periods, the pulse from filter $f_3$ is delayed three 1.33 microsecond periods, $f_4$ is delayed two periods, and the pulse from $f_5$ is delayed one period. This delay pattern thus brings the five pulses into time coincidence since it can be seen from Table 1 that these are the inverse delays of the data program. These five pulses are added instantaneously in the summer 129 to produce one 1.33 microsecond pulse whose amplitude is proportional to the sum of the individual detected pulse amplitudes.

Because of the inherent diversity present in the use of the five frequencies as described earlier, the amplitude of this summed pulse does not follow the normal rapid fading characteristic of the troposcatter medium, but maintains a relatively constant amplitude. The variation in this amplitude due to long term fading is effectively reduced by means of the AGC action of the receiver as described previously. It should be noted here that this summed pulse known hereinafter as the sync pulse occurs at a basic repetition rate of 125 kc., since it repeats for each 8 microsecond frame used as a data pulse. When random data is being transmitted the pulse may or may not be present during each basic 8 microsecond period. However, the a priori probability of occurrence of such a pulse is ½, so on the average a pulse will appear during every other 8 microsecond period. Spectrum analysis of such a random signal indicates presence of spectral lines at the 125 kc. point as well as integral multiples thereof.

It should be further noted that no crosstalk due to the pulses appearing in the 19-voice channel is possible in this sync pulse output since the data code is mutually exclusive with respect to the other codes as previously described.

In order to extract the frequencey and phase information from this sync pulse stream, the phase detector portion of device 134 serves an important function. The phase detector has as its two signal inputs this sync pulse stream and a similar 125 kc. pulse stream from the timing circuits 133. The phase detector produces an output whenever the two input signals are not in phase. The polarity of this output is a function of the polarity of the phase difference. Whenever such a condition exists this error signal is used to adjust the 750 kc. clock 135 in frequency and phase in a direction to reduce the error signal. The clock is a highly stable (quartz-crystal) controlled device provided with a voltage variable, solid state capacitor in the oscillator circuit, this voltage variable capacitor serving to make small changes in frequency and phase of the clock necessary to achieve exact synchronization. A preferred clock for our purposes is made by the James Knights Company of Sandwich, Illinois, model number JKTO–43.

The 750 kc. output of clock 135 is in the form of a square wave output and serves as the basic reference for the timing circuits 133 in their role of generating all basic timing signals required for proper operation of the receiver gating circuits.

We may now return to the problem of obtaining initial synchronization, that is to say under the condition which would prevail when the equipment is first turned on and exact synchronization betwen the transmitter and receiver does not obtain. It is clear that under this condition the gating switch 132 which serves to turn on the gated envelope detectors 127 would not in fact turn on these detectors at the proper time. For this reason, the gating switch 132 is disabled during this synchronization-acquisition phase. In other words, the gated envelope detectors are opened continuously at this time. At the transmitter, the transmission of voice or data is inhibited until such time as synchronization is achieved. During this period, known as the acquisition period, a steady signal will be transmitted in the data program channel interrupted periodically for reasons to be explained more fully later. However, for the majority of the time a steady output signal will be obtained due to the data channel input. At the receiver the output of the data of the summer 129 can be seen to be a stream of 1.33 microsecond pulses at a 125 kc. repetition rate. At this time, the 750 kc. clock 135 will not be in phase for frequency coincidence of the timing signal with this 125 pulse stream. However, the action of the phase detector with the 125 kc. synchronizing pulse stream as one of its inputs will serve to pull the clock into the necessary synchronization. As synchronization occurs the gating switch 132 will then be producing the proper time gates to the gated envelope detectors 127. This synchronization condition is sensed by the sync circuits generating an acquisition signal which turns on the gating switch 132, thus changing the system from the acquisition period to the operating period. Subsequent to this time normal voice and data may then be transmitted and synchronization will be maintained as previously described.

One other operation which must be performed during the acquisition period is one of identifying the beginning of the voice sample periods of 128 microseconds. This is necessary for the proper demodulation of the quantized pulse position voice signals. The identification pulse which is required by the program selecting matrix for marking the beginning of each voice sample period is generated in the timing circuits 133. In order to initiate this signal at the correct time with reference to the similar transmitter reference, a pattern is introduced into the continuous data input at the transmitter during the acquisition period as noted previously. This pattern may be, for example, a 3-bit Barker code such as taught in Patent No. 2,700,696. The Barker code is suitable since it may be uniquely detected, as is well known. This Barker code pattern is inserted at the beginning of the sample period at the transmitter and subsequently appears in the sync pulse stream at the output of the summer 129 in the receiver during acquisition. A pattern recognition circuit 131 in the receiver notes the time of occurrence of this Barker pattern by making a continuous measurement of the autocorrelation function of the incoming pulse stream and identifies the presence of the Barker pattern by means of the sharp rise in amplitude, characteristic of the autocorrelation of a Barker pattern. In this manner it produces a marker pulse in the timing circuits 133 which serves as a circuit reference for this sample period beginning time.

It is also desirable that during the normal operating period, that is to say after acquisition, that a similar pattern be transmitted occasionally to insure that this reference is maintained.

With respect to the overall synchronization problem inherent in a troposcatter system the clocks used at both transmitter and receiver are highly stable and will maintain their frequencies for periods of about ten seconds with no correction needed. Thus occasional deep fades occurring simultaneously on all five frequencies can be tolerated for periods of as great as ten seconds without requiring another acquisition operation.

While the foregoing functional description of the operation system indicates that a unique time-frequency coding scheme is used to allow the superposition of a multiplicity signal program in the same basic time intervals, a more complete appreciation and understanding of the advantages inherent in our invention may be obtained by a different look at the actual job performed by this invention. For example, one viewpoint of the signal sent in a given voice program to represent the quantized amplitude level of the signal in that program at a time of sampling is that this level has been converted to a pulse-code analogous to well known pulse code modulation techniques. However, where usual PCM techniques limit the number of possible code combinations to approximately the number of information bits to be transmitted or simply add a relatively few extra bits for parity checks. In our system it may be seen that there are in actuality 96 time slots occurring in each 128 microsecond sample period. The number of possible code points for 96 bits is $2^{96}$, which is of course an extremely large number. Of this high number of code points, each program uses only 16 of these code points. Thus the inherent error correction capabilities may be seen. For example, one level may be transmitted as a number of zeros, five ones in succession and followed by a number of zeros such that the total number of zeros and ones is 96. Due to the crosstalk and noise unavoidably present, a number of zeros may be identified at the receiver as ones. However, the maximum likelihood detector ignores these extraneous ones and makes its decision on the portion of the total code containing the five ones. In other words, the maximum likelihood detector approximates an error detecting and correcting system which is a number of orders of magnitude simpler in circuitry and construction than a conventional error detecting and correcting digital circuit accomplishing the same end. It is this characteristic that allows the superposition in time on the same frequency band of a large number of signals.

Although we have described a preferred embodiment of our invention, it is within the scope of our invention that the primary aims may be accomplished by various other embodiments. For example, the number of frequencies used to obtain a diversity improvement may be less than described where a smaller gain is needed and may be greater than described where a higher gain is needed. Also various combinations of voice and data channels may be provided within the bandwidth limitations of a given system and a different number of quantizing steps in the quantized voice circuits may be used where either higher audio fidelity is required or where lower fidelity may be tolerated. Such changes will simply be reflected in changes in bandwidth of the transmitted signal.

Certain of the system implementation methods may also be performed differently without going beyond the intent and scope of this invention. For example, a simple threshold type detector may be used in place of the MLD in applications where the expected crosstalk pulse levels in the voice channels is low. Another example may be that other types of signal detectors are possible, such as matched filter techniques or correlation type detectors.

In the receiver, preamplifiers such as a parametric amplifier might advantageously be used ahead of the mixer without going beyond the intent and scope of our invention.

Whereas in the embodiment of our invention we have utilized a pulse type communication system because of the inherent advantages of pulse systems for data handling and multiple hop relays, it is within the scope and intent of our invention to apply the multiple frequency diversity scheme, wherein a single transmitter power-amplifier, antenna, and antenna feed is used and a single receiving antenna, antenna feed and receiver is used, to other types of signal structures as well as to pulse types. For example a typical frequency modulated signal may be used in conjunction with this technique. In this case the multiple oscillators would be running continuously rather than being gated by pulses and each of the multiple oscillators would be frequency or phase modulated by the same audio signal. Thus the same frequency modulated signal would be transmitted on each of the different frequencies utilized for diversity improvement.

At the frequencies for which tropospheric scatter communication is practical, the separation of the frequency carriers will be on the order of one megacycle and sufficient spectral space is available for conventional frequency division multiplexing on each of the multiple diversity frequency carriers. It is easily seen that any conventional type of modulation may thus be used in connection with basic multiple frequency diversity schemes set forth in our invention.

We claim:

1. A diversity type communication system comprising a single transmitting device which propagates a complex intelligence-carrying radio frequency signal via the tropospheric scatter medium, and a single receiving device which receives such radio frequency signal and extracts the intelligence therefrom, said radio frequency signal generated by said transmitter having the characteristics to produce multiple order frequency diversity with a single power amplifier and a single antenna having a single feed system, such frequency diversity being achieved by the generation of a multiplicity of radio frequency carrier signals separated in frequency, where each of such carrier signals is carrying identical intelligence, said receiving device having the capability of receiving, detecting and combining the multiple frequency signals to provide a multiple diversity system gain, using single antenna and antenna feed, and single radio receiver.

2. The diversity type communication system as defined in claim 1 in which said multiple frequency signals are of a pulse type such that the intelligence carrying nature of said pulse signals has been realized by means of pulse modulation methods.

3. A pulse type communication system utilizing a form of pulse code modulation, with very high error correcting capability, wherein analog voice signals are sampled periodically such that the Nyquist sampling theorem is satisfied, said system comprising means for utilizing the entire time between voice sampling times for transmitting the code corresponding to particular voice levels, in combination with pulse code means for superimposing, upon the time interval between said voice sampling times, a multiplicity of such pulse codes representing a multiplicity of voice signals, said pulse code means comprising means for generating a unique time-frequency code peculiar to each of said multiple voice signals, and means for receiving and separating said time-frequency codes, said receiving means correcting crosstalk errors inherent in such superimposition by accepting during each of said voice sampling times, the single signal having the highest probability of being the intended signal.

4. A pulse type diversity tropospheric scatter communication system comprising transmitting device and receiving device, said transmitting device having means for producing a unique pulse code modulation from a multiplicity of voice input signals, the pulses associated with the pulse code modulation serving to generate time-frequency code consisting of a sequence of frequency bursts, each said burst comprising a different frequency and the time order of said bursts forming a code assigned to the said voice program input with which it is associated, means for accepting incoming multiple data signals, means for coding said data signals into an assigned time sequence of frequency bursts, means for adding said frequency bursts to the similar frequency burst used for the said multiplicity of voice programs, means for combining, translating and radiating said multiple frequency bursts within radio frequency domains for which tropospheric scatter methods are applicable, said receiving device having means for receiving said multiple frequency burst signals, with a single antenna system, means for separating, detecting and combining said received radio frequency bursts, means for decoding and distributing said radio frequency bursts into a multiplicity of audio output channels corresponding to the said multiplicity of audio input channels at the transmitter, means for detecting and handling the coded data signals, and means for extracting from said coded data signals synchronization signals, said synchronizing signals being used to synchronize timing circuits, utilized in said receiving device.

5. The communication system as defined in claim 4 in which said system provides a single data input channel with high data bit rate providing capability for handling a plurality of lower data rate data input programs which have been externally time-division multiplexed.

6. The communication system as defined in claim 4 including means for extracting phase and frequency information from random data pulses present in the said coded data channel necessary to correctly synchronize receiver timing circuits.

7. The communication system as defined in claim 6 in which such phase and frequency information is extracted by means of a delay device which provides time coincidence of the multiple frequency bursts to increase the probability of correct detection of said coded data pulses.

8. The pulse type diversity tropospheric scatter communication system as defined in claim 6 in which such phase and frequency information is extracted from said coded data signals for the purpose of synchronizing said timing circuits to insure correct operation of said decoding and distributing devices, said coded data signals concomitantly carrying normal data intelligence and further providing means for transmitting dummy data in said data channel during time intervals for which no actual data is being sent, said dummy data being utilized to maintain said synchronization during such time intervals.

9. A pulse type diversity communication system comprising a single transmitting device which propagates a radio frequency signal via a troposcatter medium and a single receiving device which receives the radio frequency signal and extracts the intelligence therefrom, said signal generated by said transmitter having characteristics for producing multiple order frequency diversity utilizing a form of pulse code modulation with very high error correcting capabilities, in combination with pulse code means for superimposing a multiplicity of pulse codes on each other in time such that the crosstalk errors inherent in such superposition are essentially corrected, and means for holding such crosstalk errors to a very small number by the use of a unique time-frequency code peculiar to each of said multiple order signals, each of said unique time-frequency codes being implemented by means of the multiple frequencies necessary for the diversity feature, said multiple frequency signal thus serving the dual purpose of providing diversity gain and time-frequency coding characteristics.

10. A diversity type pulse communication system utilizing the tropospheric scatter medium comprising a single transmitting device which propogates a complex radio frequency signal, such complex radio frequency signal having inherent multiple frequency diversity capabilities, and a single receiving device for receiving said complex radio frequency signal, said transmitter device comprising time-frequency multiplexing means for transmitting a plurality of information-carrying signals, said time frequency multiplexing means simultaneously producing said complex radio frequency signal, said receiving device comprising means for achieving diversity gains from said complex radio frequency signal, said receiving device including means for separating said time-frequency multiplex signals into a plurality of outputs in cooperation with said means for achieving diversity gains.

11. The communication system as defined in claim 10 in which said complex radio frequency signal comprises the superimposition in time of such plurality of information-carrying signals, with each information-carrying signal being identified by a time-sequence of pulses, each pulse being transmitted on a different frequency.

12. A pulse type communication system having means for transmitting voice signals utilizing pulse code modulation, said transmitting means utilizing quantizing means for quantizing the amplitudes of such voice signals into a comparatively small number of discrete amplitude levels, and processing means for processing incoming voice signals prior to quantization to make possible in a receiving device a highly intelligible reproduction of such voice signals from such small number of such discrete amplitude levels, thereby resulting in a low signal density, latter processing means comprising pre-emphasis means for effectively differentiating such voice signals, automatic gain control means for producing a uniform average audio level of such differentiated voice signals, and instantaneous compressor means receiving such differentiated voice signals and by virtue of non-linear characteristics, changing the amplitude probability distribution of said voice signals from an approximately gaussian distribution to an approximately uniform distribution within a restricted dynamic range; a receiving device capable of receiving transmitted voice signals and having means for demodulating such voice signals, such device having means for expansion of such demodulated voice signals in order to restore in part the original dynamic range thereof, means for filtering such voice signals to remove harmonic distortion components unavoidably introduced in such voice signal expansion, and means for de-emphasis of such expanded and filtered voice signals to restore the original frequency characteristics thereof.

References Cited by the Examiner

UNITED STATES PATENTS

| | | | |
|---|---|---|---|
| 2,530,957 | 11/1950 | Gilman | 343—203 |
| 2,705,795 | 4/1955 | Fisk et al. | 343—203 |
| 2,895,128 | 7/1959 | Bryden | 343—203 |
| 3,020,399 | 2/1962 | Hollis | 325—154 |
| 3,150,374 | 9/1964 | Sunstein et al. | 343—203 X |
| 3,160,711 | 12/1964 | Schroeder | 325—55 X |

DAVID G. REDINBAUGH, *Primary Examiner.*

J. W. CALDWELL, *Assistant Examiner.*